United States Patent
Lee et al.

(10) Patent No.: US 10,620,636 B2
(45) Date of Patent: Apr. 14, 2020

(54) METHOD OF IDENTIFYING FUNCTIONAL REGION IN 3-DIMENSIONAL SPACE, AND ROBOT IMPLEMENTING THE METHOD

(71) Applicant: LG ELECTRONICS INC., Seoul (KR)

(72) Inventors: Changhyeon Lee, Seoul (KR); Han Shin Kim, Seoul (KR); Kyuchun Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 213 days.

(21) Appl. No.: 15/875,235

(22) Filed: Jan. 19, 2018

(65) Prior Publication Data

US 2018/0210448 A1    Jul. 26, 2018

(30) Foreign Application Priority Data

Jan. 25, 2017    (KR) .................. 10-2017-0012254

(51) Int. Cl.
*G05D 1/02* (2020.01)
*G06T 7/50* (2017.01)
(Continued)

(52) U.S. Cl.
CPC ........ *G05D 1/0214* (2013.01); *A47L 11/4052* (2013.01); *A47L 11/4061* (2013.01); *B25J 5/007* (2013.01); *B25J 11/0085* (2013.01); *B25J 15/0019* (2013.01); *G05D 1/024* (2013.01); *G05D 1/0242* (2013.01); *G05D 1/0255* (2013.01); *G05D 1/0274* (2013.01); *G05D 1/0291* (2013.01); *G06T 7/50* (2017.01); *A47L 2201/04* (2013.01); *G05D 2201/0203* (2013.01);
(Continued)

(58) Field of Classification Search
CPC .... G05D 1/0214; G05D 1/024; G05D 1/0242; G05D 1/0255; G05D 1/0274; G05D 1/0291; G06T 7/50; A47L 11/4061; B25J 11/0085; B25J 5/007; B25J 15/0019
USPC ........................................... 701/25
See application file for complete search history.

(56) References Cited

U.S. PATENT DOCUMENTS

| | | | |
|---|---|---|---|
| 6,565,668 B1 * | 5/2003 | Sandberg | A01K 1/01 134/18 |
| 10,386,840 B2 * | 8/2019 | Choe | B60K 31/0008 |

(Continued)

FOREIGN PATENT DOCUMENTS

| | | |
|---|---|---|
| KR | 10-2002-0080900 | 10/2002 |
| KR | 10-2013-0042422 | 4/2013 |
| KR | 10-2014-0038239 | 3/2014 |

OTHER PUBLICATIONS

Korean Office Action dated Nov. 12, 2018 issued in Application No. 10-2017-0012254.

*Primary Examiner* — Yazan A Soofi
(74) *Attorney, Agent, or Firm* — Ked & Associates, LLP

(57) ABSTRACT

The present disclosure relates to a method of identifying a functional region in a 3-dimensional space and a robot implementing the method, and the robot comprises a sensing module that senses a protrusion located outside a robot and provides height and depth information of the sensed protrusion; a functional unit that provides a predetermined function to the outside; a moving unit that moves the robot; a map storage unit that stores a map required for movement of the robot; and a control unit that controls these components.

20 Claims, 18 Drawing Sheets

(51) Int. Cl.
*A47L 11/40* (2006.01)
*B25J 5/00* (2006.01)
*B25J 11/00* (2006.01)
*B25J 15/00* (2006.01)

(52) U.S. Cl.
CPC ... *G06T 2207/10028* (2013.01); *Y10S 901/01* (2013.01); *Y10S 901/41* (2013.01); *Y10S 901/49* (2013.01)

(56) References Cited

U.S. PATENT DOCUMENTS

| | | | |
|---|---|---|---|
| 2012/0197439 A1* | 8/2012 | Wang | B25J 9/1689 |
| | | | 700/259 |
| 2013/0226344 A1* | 8/2013 | Wong | G05D 1/024 |
| | | | 700/258 |
| 2014/0129027 A1* | 5/2014 | Schnittman | G05D 1/0219 |
| | | | 700/253 |
| 2015/0235373 A1* | 8/2015 | Kato | A61B 1/00009 |
| | | | 348/51 |
| 2016/0051104 A1* | 2/2016 | Shin | A47L 11/4072 |
| | | | 15/3 |
| 2016/0313741 A1* | 10/2016 | Lindhe | G05D 1/0248 |
| 2018/0181127 A1* | 6/2018 | Choe | G05D 1/024 |
| 2018/0239022 A1* | 8/2018 | Lee | G01S 7/4817 |
| 2019/0220025 A1* | 7/2019 | Chen | G05D 1/0214 |
| 2019/0248007 A1* | 8/2019 | Duffy | B25J 9/1615 |
| 2019/0267219 A1* | 8/2019 | Uemura | H01J 37/3288 |

* cited by examiner

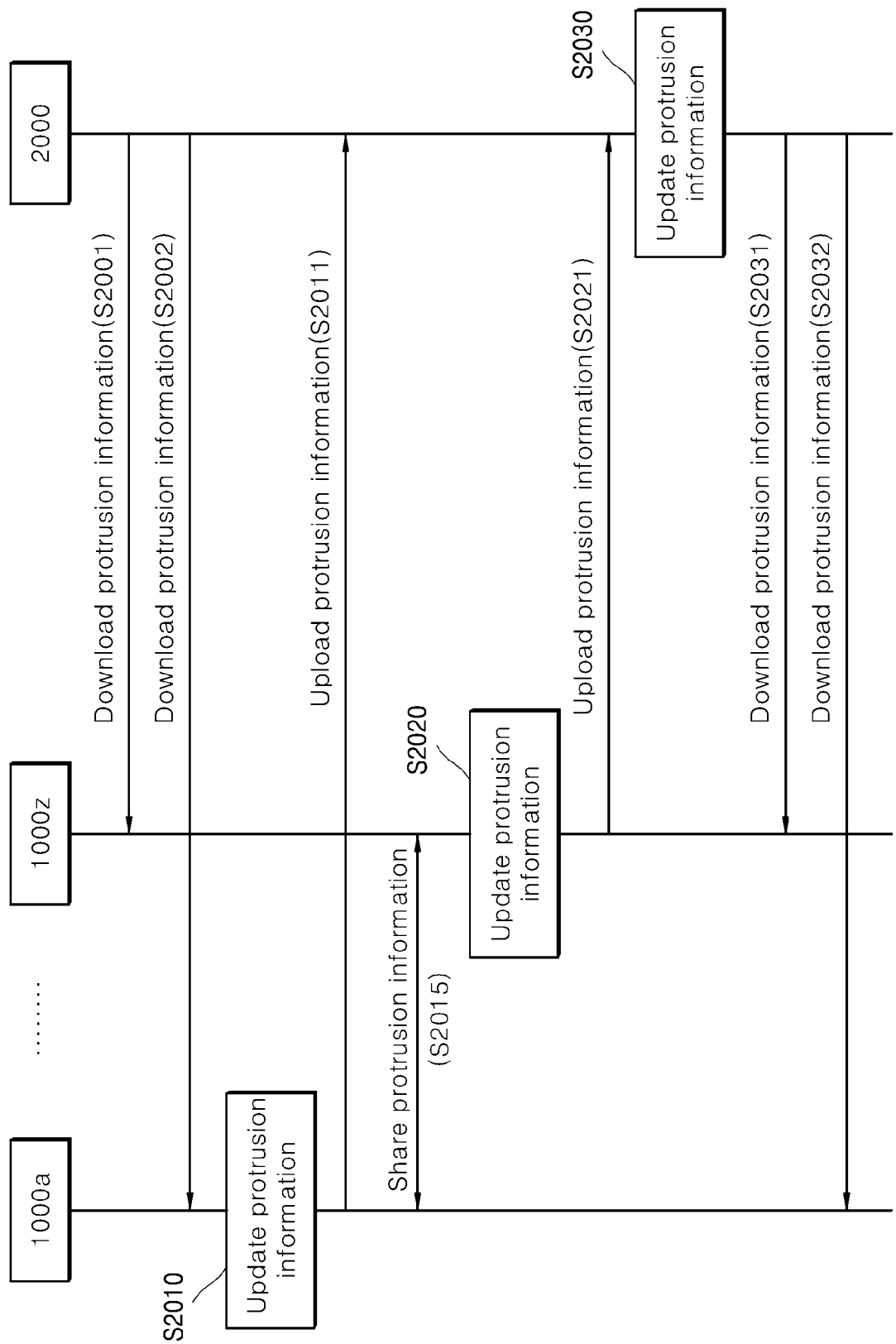

METHOD OF IDENTIFYING FUNCTIONAL REGION IN 3-DIMENSIONAL SPACE, AND ROBOT IMPLEMENTING THE METHOD

CROSS-REFERENCE TO RELATED APPLICATION

This application claims priority under 35 U.S.C. § 119 to Korean Application No. 10-2017-0012254, filed on Jan. 25, 2017, whose entire disclosure is hereby incorporated by reference.

BACKGROUND

1. Field

The present disclosure relates to a method of identifying a functional region in a 3-dimensional space and a robot implementing the method.

2. Background

In order for a robot to operate in a space where human and material exchanges actively occur, such as airports, schools, government offices, hotels, offices, factories and so on, the robot has to have a map on the whole space. In addition, it is necessary for the robot to identify a region where the robot can perform a given specific function from the map and perform the function in the corresponding region.

In general, a robot should perform a specific function in the whole space while avoiding walls, glass, protruding structures and the like. However, a robot that performs a specific function in a large space needs to three-dimensionally identify the surrounding spaces. In particular, structures are not uniformly arranged in a space where human and physical exchanges actively occur, such as airports, schools, public offices, hotels, offices, factories and so on, and temporary structures such as information desks are often provided and then removed. Therefore, it is necessary for the robot to identify various spatial changes occurring after the initial construction of a map and perform a specific function. Accordingly, there is a need for a technique for allowing a robot to determine a space in a 3D manner to identify whether or not the space is a space where the robot can perform a function, analyzing the space, and moving the robot based on a result of the analysis.

BRIEF DESCRIPTION OF THE DRAWINGS

The embodiments will be described in detail with reference to the following drawings in which like reference numerals refer to like elements, and wherein:

FIG. 20 is a diagram showing a process of exchanging information on a protrusion between a plurality of robots or between a robot and a server according to an embodiment of the present disclosure.

DETAILED DESCRIPTION

Figure 1:
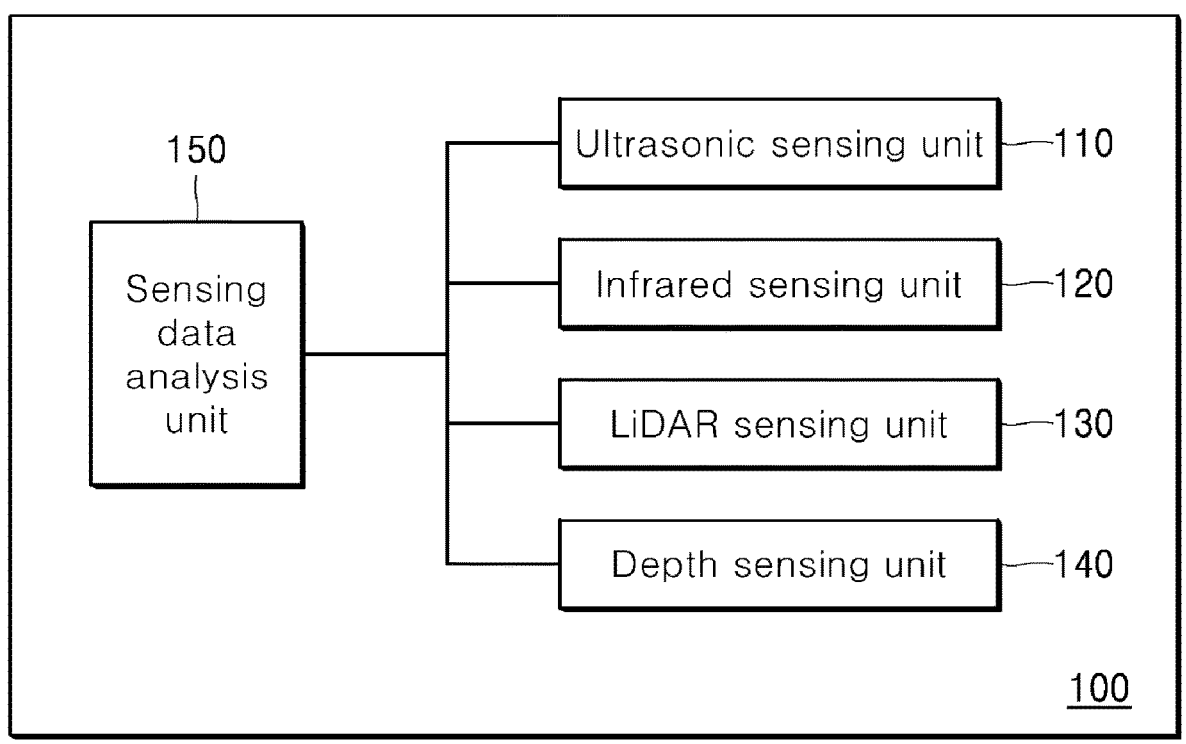
FIG. 1 is a view showing the configuration of a sensing module for three-dimensionally sensing a space according to an embodiment of the present disclosure.

In the following description, a robot comprises a moving device having a specific purpose (cleaning, security, monitoring, guidance, etc.) or providing functions according to the characteristic of a space in which the robot moves. Therefore, in the following description, the robot refers generally to a device that has a moving mechanism capable of moving by using predetermined information and a sensor and provides predetermined functions.

The robot can move while holding or storing a map. The map means information about a fixed wall, a stair and the like that are identified not to move in a space. In addition, the robot can store information on separate objects on the map. For example, a guide platform attached to a fixed wall, a newly installed vending machine, etc., are not fixed objects but have fixability for a certain period of time, so they need to be stored as additional fixtures in the map.

In addition, the robot can store a space in a 3D manner. Therefore, even when a wall or glass is located on a three-dimensional plane, the robot can check whether or not a target region is a region where the robot can enter or function, and can store information on the corresponding region. In particular, in the present disclosure, in order to enhance a specific function (for example, cleaning efficiency such as a ratio of cleaning area to real area) in a large space such as an airport, it is necessary to accurately determine a section where the robot can enter and a functional region where the robot can perform a function.

In the airport environments, if structures such as an information desk, a public phone and the like, protruding by 80 to 100 cm from the floor, cannot be recognized in advance, the cleaning efficiency may be lowered. Therefore, it is necessary to approach these structures as close as possible to perform a function such as cleaning.

A cleaning algorithm differs depending on the position of an obstacle on the upper end/middle/lower end with respect to the height of the robot. Therefore, in an embodiment of the present disclosure, ultrasonic sensor data and infrared sensor data can be fused so that a control unit of the robot can accurately determine a region where the robot can enter, a region where the robot cannot enter, and a functional region where the robot can perform a specific function when the entry is impossible. In particular, various sensors can be used to collect and store 3D obstacle information of front/side/rear of the robot. A light distance and ranging (LiDAR) sensor can be used to collect information on a wall, glass and obstacles in the front/rear/left/right spaces to generate a map. The LiDAR sensor can sense obstacles of a certain height at a remote distance. By comparing information sensed by the LiDAR sensor with information sensed by other sensors at a short distance, it is possible to check whether or not objects located in the travelling direction of the robot or in the vicinity of the robot are objects such as a wall, glass or protrusions. Accordingly, the robot can perform different functions. In addition, the three-dimensional obstacle information collected by each sensor can be updated onto the map for utilization in the next running.

In the present disclosure, the height of the robot, that is, the height required for the robot to pass over is referred to as TOP_H. The height of an object located on the floor in the travelling direction of the robot, that is, the height over which the robot can pass, is referred to as BOTTOM_H. For example, the robot can enter when a space larger than TOP_H on the height is secured. In addition, the robot can enter when the height of an object placed on the floor is lower than BOTTOM_H. Therefore, the robot cannot pass if there is an obstacle in a range lower than TOP_H while being higher than BOTTOM_H.

The robot may have different functions in the presence of obstacles and in the absence of obstacles. For example, in one embodiment, a cleaning robot may perform a cleaning function while running in a normal running state in the absence of a protruding obstacle. On the other hand, in the presence of a protruding obstacle, the robot may stop the running state and perform the cleaning function while maintaining the approach state closest to the protrusion. In one embodiment, the cleaning function is a proximity cleaning function. In addition, a component for performing cleaning may be extended or moved outside the robot in order to secure a cleanable region.

FIG. 1 is a view showing the configuration of a sensing module for three-dimensionally sensing a space according to an embodiment of the present disclosure. A robot may have one or more sensing modules.

The sensing module 100 comprises components for performing a sensing operation, such as an ultrasonic sensing unit (or ultrasonic sensor) 110, an infrared sensing unit (or infrared sensor) 120, a LiDAR sensing unit (or LiDAR sensor) 130, and a depth sensing unit (or depth sensor) 140, and a sensing data analysis unit (or sensing data processor) 150 for analyzing a sensed value. The components constituting the sensing module 100 are logical components but need not necessarily be physically implemented in one device. For example, the infrared sensing unit 120 may be provided at a boundary region of the robot and the ultrasonic sensing unit 110 may be provided at a front center region of the robot. The depth sensing unit 140 and the LiDAR sensing unit 130 may be provided on the upper surface of the robot.

These sensing units and the sensing data analysis unit 150 can exchange the sensed information with each other via a data link or by using a radio signal. Each of the sensing units may also be a set of various sensors. For example, in order to sense an object placed in front of the infrared sensing unit 120, one or more pairs of infrared transmitting units and infrared receiving units may be physically integrated and logically instructed to the infrared sensing unit 120. Similarly, one or more pairs of ultrasonic transmitting units and ultrasonic receiving units may be physically integrated and logically instructed to the ultrasonic sensing unit 110.

If a protruding obstacle is placed in the traveling direction (i.e., moving direction), it can be checked by a combination of these sensing units whether or not the robot is allowed to pass by this obstacle. According to one embodiment, depending on which sensing unit is applied to an obstacle protruding from a wall, it can be determined whether or not the obstacle can pass by this obstacle.

In order for the robot to pass through a specific space, it is necessary to determine whether the height of a lower end obstacle placed on the floor is a height over which the robot can pass. In addition, if there is a protruding obstacle other than a planar all-around obstacle such as a wall in the front surface, it can be determined whether or not the protruding obstacle can pass through a space occupied on a specific height.

Therefore, depending on the position of the protruding obstacle (protrusion), the robot can operate to perform predetermined functions (cleaning, guidance, security, search, etc.) in proximity to the obstacle or avoid the obstacle. In addition, if the upper end height of the obstacle is lower than BOTTOM_H or the lower end height of the obstacle is higher than TOP_H, the robot can operate to run while ignoring the obstacle. In order to cope with an external obstacle, it is necessary for the robot to sense the obstacle in a 3-dimensional manner. That is, the robot can implement a 3D map using various kinds of sensing units.

In particular, the height of a robot that performs cleaning, guidance, security search, etc. in a floating population or high usage space such as an airport, a terminal, a hospital, a hotel, a school, etc. has to exceed a certain height. In this case, the robot can sense the entire space in a 3-dimensional manner, create a 3D map based on the 3-dimensional sensing and move based on the created 3D map. Thus, the sensing module 100 of the present disclosure can sense the presence of an obstacle in front and simultaneously sense the height and depth of the obstacle and provide the robot with information used to determine whether the robot can advance to, pass by or over, or avoid the obstacle.

The various sensing units sense an obstacle in the X-Y-Z axis according to their respective characteristics. The X axis is an X axis of a space in which the robot moves, and the Y axis is also a Y axis of the space in which the robot moves. The Z axis refers to the height direction of the robot. Although the robot does not move on the Z axis, it is necessary to sense the size of the obstacle on the Z axis in order to determine how the robot moves when the robot encounters the obstacle.

In one embodiment of the present disclosure, the ultrasonic sensing unit 110 may check whether or not an obstacle exists. The ultrasonic sensing unit 110 may be composed of an ultrasonic emitting unit that emits an ultrasonic wave and an ultrasonic receiving unit that receives a reflected wave of the emitted ultrasonic wave reflected from the obstacle. The ultrasonic sensing unit 110 can use the ultrasonic wave emission and reception time to calculate a distance to the obstacle. However, the ultrasonic sensing unit 110 is unable to grasp the exact height of the obstacle. Therefore, the information of the obstacle sensed by the ultrasonic sensing unit 110 is used to determine the distance to the obstacle, which can provide the distance information on the X-Y axis on which the robot moves.

Next, the infrared sensing unit 120 can sense the height of an obstacle placed in the direction in which the robot moves. For example, when the infrared sensing unit 120 is provided at both ends of the uppermost (e.g., a top edge) of the robot, the infrared sensing unit 120 senses an obstacle placed in front to determine whether the obstacle is located at the upper end of the robot or has a height over which the robot can pass. The infrared sensing unit 120 may be provided at both ends of the lowermost (e.g., a bottom edge) of the robot. In this case, the infrared sensing unit 120 senses an obstacle placed at the lower end of the front to determine whether or not the obstacle has a height over which the robot can pass.

The LiDAR sensing unit 130 scans obstacles placed at a specific height. Therefore, although it may identify an obstacle located at the specific height (the height H in the Z axis), it cannot identify an obstacle located at a position higher or lower than H. On the other hand, the LiDAR sensing unit 130 can sense obstacles in a wide range including a very long sensing distance and a 270° or 360° orientation. Accordingly, the LiDAR sensing unit 130 can create a map by sensing the obstacles in the wide range. This map stores the location of the obstacles located at the specific height.

The depth sensing unit 140 senses the distance to an obstacle placed in front. The depth sensing unit 140 can sense the distance to an object photographed on a reference region (for example, pixel) basis to generate a picked image in which the three-dimensional distance information is reflected. Since the sensing range of the depth sensing unit 140 is not limited to a specific height, the depth sensing unit 140 can identify an obstacle located at a height at which the infrared sensing unit 120 is not provided. In particular, the information sensed by the depth sensing unit 140 may be used to determine whether or not an obstacle located a position sensed by the infrared sensing unit 120 is a vertically elongated obstacle.

In addition, the sensing information of the LiDAR sensing unit 130 and the sensing information of the depth sensing unit 140 may be combined to identify a space where glass is placed. The depth sensing unit 140 is hardly 100% accurate in sensing the glass through which light is transmitted. Therefore, a sensing value obtained by the depth sensing unit 140 and a sensing value obtained by the LiDAR sensing unit 130 can be combined to identify a space where things such as whole glass are placed.

In the following description, information calculated by sensing an obstacle located in the upper or lower front of the robot by the infrared sensing unit 120 is referred to as a boundary line of the obstacle. The boundary line includes distance information. Information calculated by sensing an obstacle located in the front of the robot by the ultrasonic sensing unit 110 is referred to as a distance to the obstacle. Information calculated by sensing a depth value of an obstacle located in front by the depth sensing unit 140 is referred to as depth information. In cooperation with the above-mentioned obstacle boundary line and distance information, the depth information contributes to calculating the overall contour of the obstacles and the depths of the obstacles.

In addition, the LiDAR sensing unit 130 is a basis for creating a map of a space in which the robot is provided and comparing or determining obstacle information detected by other sensing units. For example, in a state where glass or a wall placed in a specific space is identified by the LiDAR sensing unit 130, when the other sensing units sense a protruding obstacle, it can be determined that the robot cannot pass by the obstacle.

Figure 2:
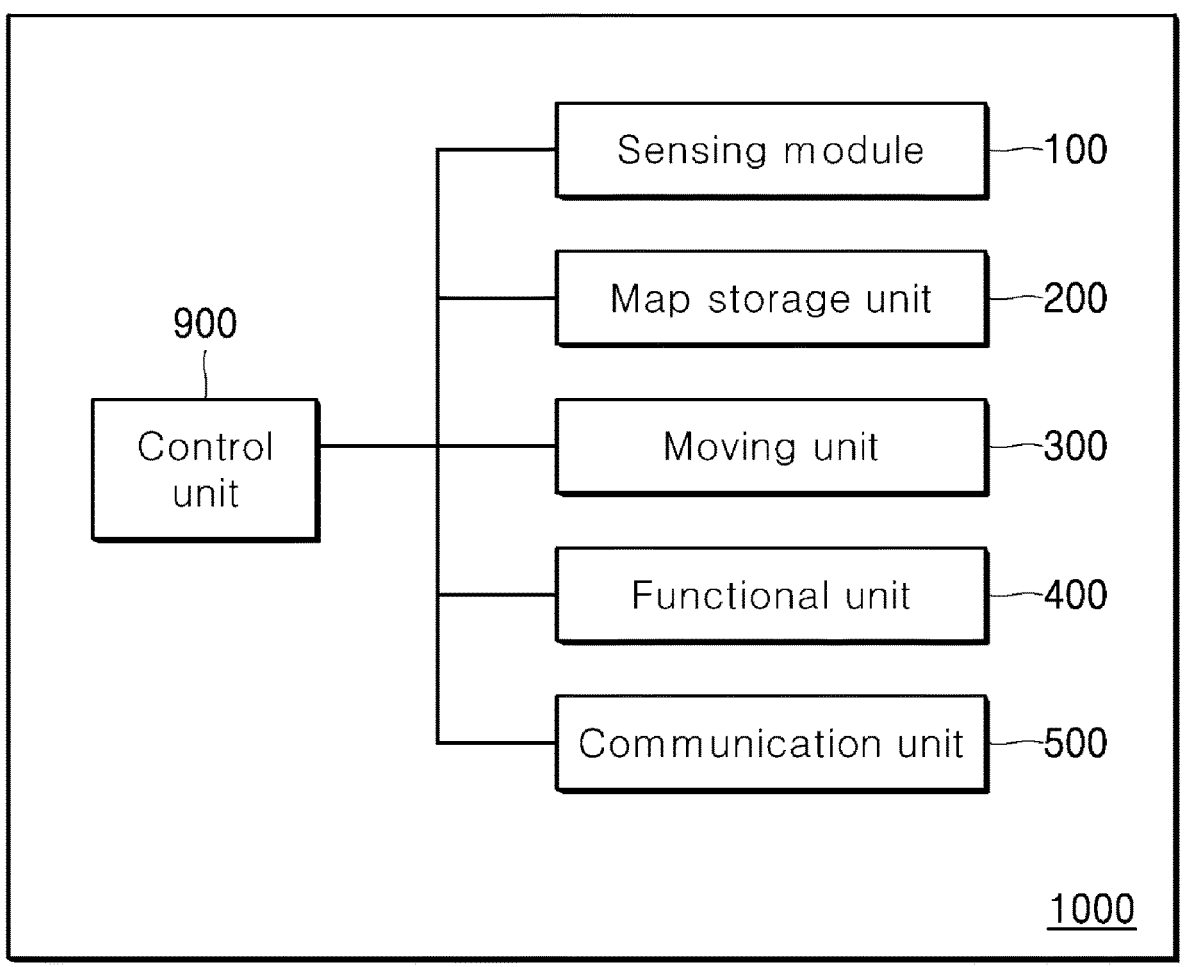
FIG. 2 is a view showing the configuration of a robot according to an embodiment of the present disclosure.

FIG. 2 is a view showing the configuration of a robot according to an embodiment of the present disclosure. Referring to FIG. 2, a robot 1000 comprises a sensing module (or sensor) 100 for sensing an external obstacle, a map storage unit (or memory) 200 for storing a map, a moving unit (or driven wheel) 300 for controlling movement of the robot 1000, a functional unit (or functional module) 400 for performing a predetermined function of the robot, a communication unit (or communication interface) 500 for exchanging the map or information on inaccessible regions such as moving walks or escalators with other robots, and a control unit (or controller) 900 for controlling these respective components.

The moving unit 300 is a mechanism for moving the robot 1000, such as a driven wheel, and moves the robot 1000 under control of the controller 900. At this time, the control unit 900 can use the information stored in the map storage unit 200 to check the current position of the robot 1000, and provide a movement signal to the moving unit 300. In addition, the control unit 900 can analyze the information on the external obstacle sensed by the sensing module 100 to check whether the obstacle is located in the traveling direction (moving direction), and then control the movement of the moving unit 300.

The functional unit 400 provides a specialized function of the robot. For example, in case of a cleaning robot, the functional unit 400 comprises components required for cleaning, such as a cleaning head. In case of a guidance robot, the functional unit 400 comprises components required for guidance, such as user interface to receive a desired location and to output guidance instructions. The functional unit 400 may comprise various components depending on functions provided by the robot. In addition, the control unit 900 can control the functional unit 400 to perform a specific function, or control the functional unit 400 not to perform the function depending on the size or characteristics of an external obstacle.

The map storage unit (or map database) 200 stores the map. The map means information on a space in which the robot 1000 can move. The map may include information on location of fixed objects such as walls and glass in subdivided unit regions of the whole space or information on the height and material of the fixed objects. The unit region is sectional part of the whole space, and the unit of storing information, computing and calculating the distance based on the sensed data. In addition, the map storage unit 200 can store not only the map but also three-dimensional information on a movable or transient obstacle or a fixed obstacle. For example, if a protruding obstacle is located in a region determined as a wall by the LiDAR sensing unit 130, it may be displayed on or identified in the map.

The map may be configured in various ways. In one embodiment, the whole space may be divided into unit regions on an XY axis basis and the map may include information on the existence of a fixed object or a protruding obstacle in each unit region. In addition, it is possible to check whether or not a protruding obstacle having a specific height on the basis of the Z axis is located in each unit region.

It is illustrated in FIG. 2 that the map storage unit 200 is included in the robot 1000. However, in another embodiment, the map storage unit 200 may be included in a separate server. In this case, the robot 1000 can receive the map stored in the server in real time or at a predetermined time interval in communication with a communication unit of the server. Further, the robot 1000 can transmit further information to be stored to the server.

The map stored in the map storage unit 200 may be created using a LiDAR sensor. For example, in FIG. 1, a LiDAR sensor may be additionally provided to allow the robot to constantly create and update a map. In addition, the Lidar sensor can provide information necessary for constructing the map in cooperation with the other sensing units 110, 120 and 140 in order to grasp information on a protrusion.

Figure 3:
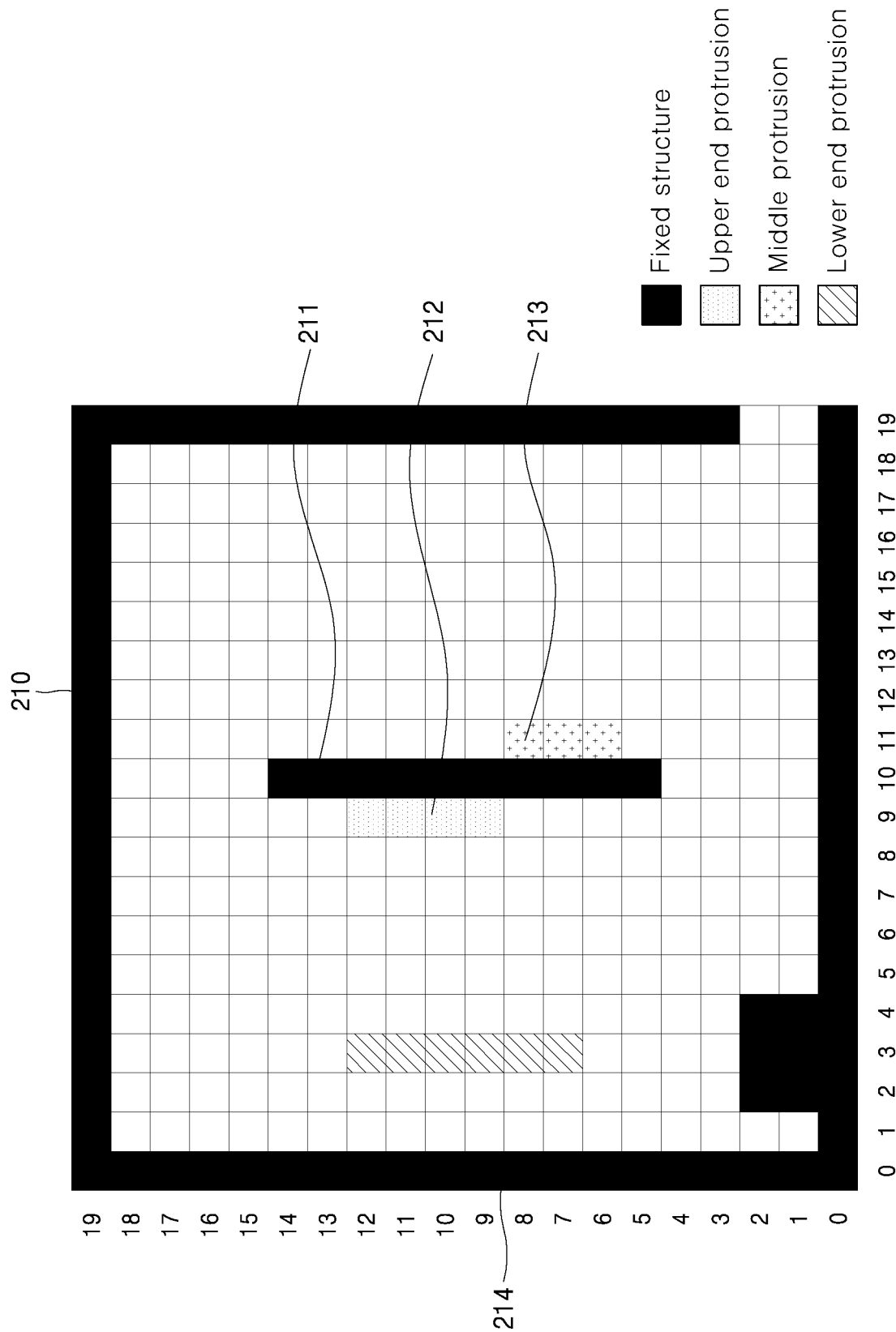
FIG. 3 is a view showing an example map in which a space is composed of unit regions according to an embodiment of the present disclosure.

FIG. 3 is a view showing an example map 210 in which a space is composed of unit regions according to an embodiment of the present disclosure. In the map 210, a unit region in white indicates a space in which the robot 1000 can move because there is no object such as an obstacle.

In FIG. 3, the map 210 may be configured as a kind of bit map in the form of an image file, in which each bit in the bitmap represents one unit region. The unit regions may be expressed by the left bottom (0,0) to the right top (19,19). When the unit regions of the map 210 are expressed by 20×20 as shown in FIG. 3, unit regions 211 in black have information on a space in which fixed objects such as a wall, glass and the like are located.

Reference numerals 212 to 214 denote information on location of protrusions. The protrusions mean external objects located to be lower than the height of the robot. The reference numeral 212 denotes a protrusion located at a height smaller by a predetermined size than the height of the robot. In one embodiment, this protrusion is referred to as an upper end protrusion. This may be sensed by the infrared sensing unit 120 provided on the upper end of the robot.

The reference numeral 213 denotes a protrusion located at a middle height of the robot. In one embodiment, this may be sensed by the ultrasonic sensing unit 110 or the depth sensing unit 140. The reference numeral 214 denotes a protrusion such as an electric wire, molding or the like provided on the floor in the direction in which the robot moves. This is used to determine whether or not the moving unit (300 in FIG. 2) of the robot can advance. The heights of the protrusions 212 to 214 stored in the map are all smaller than TOP_H. The height of the protrusion 214 is larger than BOTTOM_H.

In the process of creating the map by the RiDAR sensing unit 130, a protrusion may not be located in the height region where the RiDAR sensing unit 130 senses the protrusion, and therefore information on the protrusion may not be stored in the map. In the process of applying the embodiment of the present disclosure, the sensing module 100 can grasp the information on the protrusion and store it in the map. The map 210 of FIG. 3 may store the information on the fixed object 211 of the moving space of the robot in a two-dimensional manner and store the information on the protrusions 212, 213 and 214 in a three-dimensional manner. The heights at which the protrusions are located may be smaller than the height of the robot.

Although it is illustrated in FIG. 3 that a fixed structure and a protrusion are distinguished from each other by patterns or colors on the map, they may be also distinguished from each other by numbers. For example, a value of 10 may be assigned for the fixed structure 211, a value of 1 for the upper end protrusion 212, a value of 2 for the middle protrusion 213 and a value of 3 for the lower end protrusion 214 in the map 210.

In addition, information on the heights of the lower and upper ends of the protrusion may also be stored together. Ranges at the height of the protrusion may be classified as shown in the following table. The table below is illustrative and may vary depending on the characteristic of the protrusion.

TABLE 1

| Group | Lower end start height | Upper end start height |
|---|---|---|
| 1 | Higher(Larger) than TOP_H*0.8 | Lower(Smaller) than TOP_H |
| 2 | Higher(Larger) than TOP_H*0.4 | Lower(Smaller) than TOP_H*0.6 |
| 3 | 0 or higher(larger) | Lower(Smaller) than BOTTOM_H*1.2 and higher(larger) than BOTTOM_H*0.9 |
| 4 | 0 or higher(larger) | Lower(Smaller) than TOP_H*0.6 |
| 5 | 0 or higher(larger) | Lower(Smaller) than TOP_H and higher(larger) than TOP_H*0.6 |

To sum up, the sensing unit 100 of the robot 1000 according to an embodiment of the present disclosure senses a protrusion located in a region where the robot 1000 enters or approaches, and reflects the height information of the protrusion to create the map as shown in FIG. 3. Then, the robot 100 can perform a given function based on the map of FIG. 3 according to the height of the protrusion.

For example, the robot 1000 that reflects the degree of protrusion and height of the protrusion and performs a cleaning function can perform the function of cleaning the floor of a region where the protrusion is located. To this end, the sensing module 100 can use the various sensing units shown in FIG. 1 to check the height of the protrusion, the height of a protruding obstacle placed on the floor, the presence of a protrusion located in the middle region of the robot, and so on, depending on the size of the robot.

Figure 4:
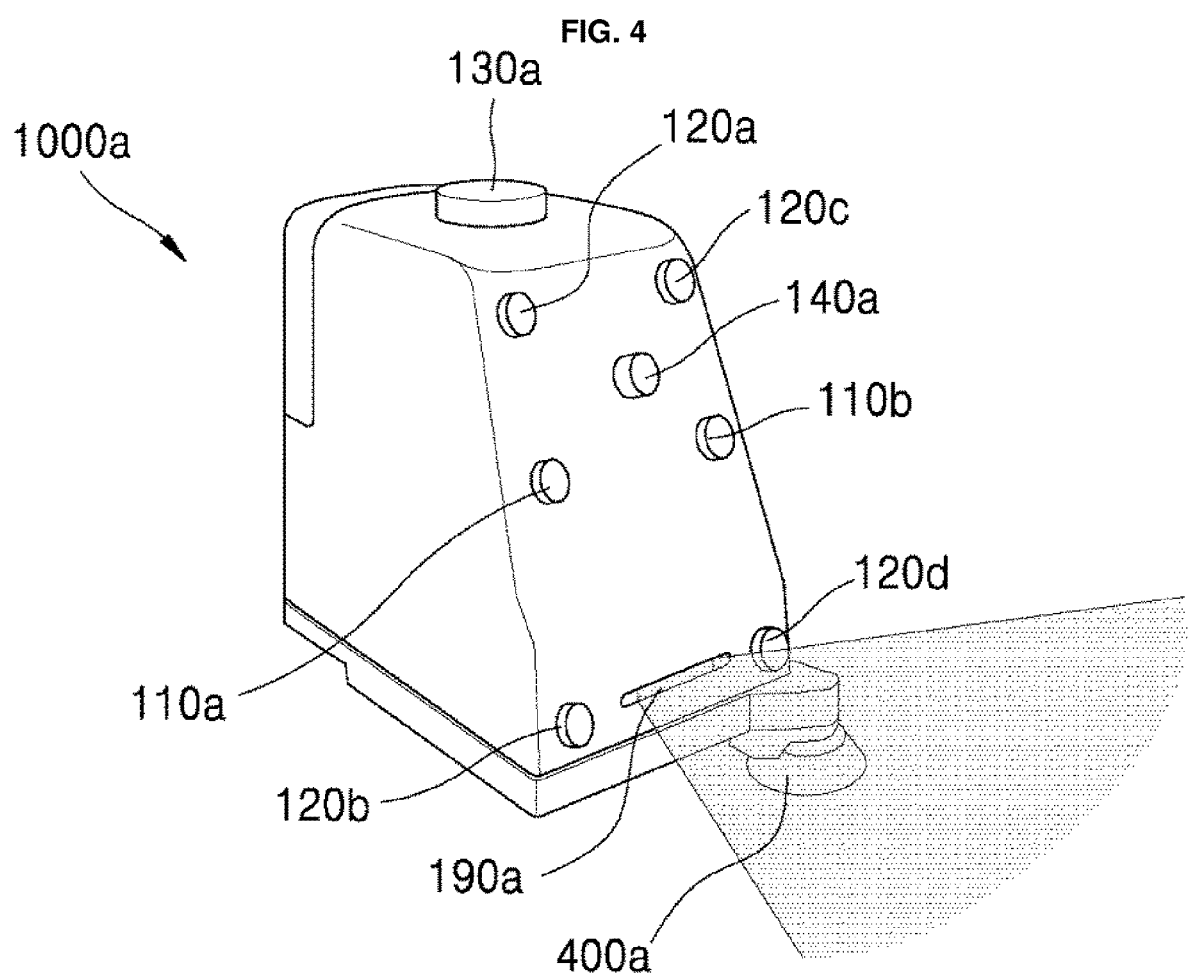
FIG. 4 is a view showing the configuration of arrangement of various sensing units according to an embodiment of the present disclosure.

FIG. 4 is a view showing the configuration of arrangement of various sensing units according to an embodiment of the present disclosure. Infrared sensing units 120a to 120d, ultrasonic sensing units 110a and 110b, a LiDAR sensing unit 130a and a depth sensing unit 140a are provided in the front of a robot 1000a. According to some embodiments, one or more of various kinds of sensing units may be provided. As shown in FIG. 4, the infrared sensing units 120a to 120d may be provided in the top and bottom of the robot 1000a to check the height of a protruding obstacle. In addition, the ultrasonic sensors 110a and 110b may be provided to effectively sense a protrusion located in the intermediate region rather than the height sensed by the sensing units 120a to 120d.

The LiDAR sensing unit 130a can create the whole map. The depth sensing unit 140a can sense the depth of an obstacle located in front and can improve the accuracy of the information sensed by the infrared sensing units 120a to 120d and the ultrasonic sensing units 110a and 110b.

In addition, a lower side sensing unit (or lower side sensor) 190a may be selectively provided to check whether there is another obstacle in a region near the floor in the traveling direction (moving direction). Along with the infrared sensing units 120b and 120d provided on the lower side, the lower side sensing unit 190a may be provided close to the floor to check an obstacle protruding from the floor or the material of a space adjacent to the floor. In one embodiment, the lower side sensing unit 190a may be an ultrasonic sensing unit. In another embodiment, the lower side sensing unit 190a may be one of various sensors that sense the lower side or an image of the lower side.

Besides, a functional unit 400a may be provided. In FIG. 4, the functional unit 400a may be a cleansing head such as a brush, a mop, a dust suction port or the like which is a component for performing cleaning. When the functional unit 400a performs security, a component for performing bomb detection may be included in the functional unit 400a. The moving unit 300 is provided under the robot and is not shown in FIG. 4.

The robot of FIGS. 3 and 4 is summarized as follows. The sensing module 100 senses a protrusion located outside the robot to provide height and depth information. The height and depth information may be calculated by combining values sensed by the infrared sensing units 120a to 120d, the ultrasonic sensing units 110a and 110b, the LiDAR sensing unit 130a and the depth sensing unit 140a.

The height means the height of a protrusion from the ground. The depth of the protrusion means the protruding length of the protrusion. For example, in one embodiment, the depth of a protrusion installed on a wall may be a distance from the end of the protrusion to the wall.

For example, the infrared sensing units 120a and 120c positioned at the upper end can sense a protrusion placed in the vicinity of the TOP_H height. In addition, the infrared sensing units 120b and 120d positioned at the lower end can sense a protrusion placed in the vicinity of the BOTTOM_H height. The ultrasonic sensing units 110a and 110b can sense a protrusion between BOTTOM_H and TOP_H.

The functional unit 400a provides preset functions. Although the cleaning function is shown in FIG. 4, other components that provide specialized functions such as guidance and security may be included in the robot 1000a. The moving unit (300 in FIG. 3) moves the robot and the map storage unit 200 stores a map required for movement of the robot, as shown in FIG. 3.

The control unit 900 controls the sensing module 100, the moving unit 300 and the map storage unit 200. The control unit 900 compares the information (for example, the height and depth information of a protrusion) provided by the sensing module 100 and the information stored in the storage unit 200 to identify a functional region where the functional unit 400a can function in a three-dimensional space including an obstacle. Thus, the control unit 900 can controls the moving unit 300 and the functional unit 400 so that the functional unit 400a, for example, the functional unit 400a that provides the cleaning function, can perform the cleaning even if the protrusion is provided in front.

The various sensing units shown in FIG. 4 can be used to identify an obstacle higher than the height of the upper end, middle, or lower end of the robot. Particularly, the infrared sensing units 120a to 120d for accurately sensing a protrusion of a specific height, the ultrasonic sensing units 110a and 110b for accurately sensing the existence of protrusion rather than the height thereof, the depth sensing unit 140a for sensing the contour and depth of a protrusion in front, and the LiDAR sensing unit 130a capable of creating an integrated map for the periphery of the robot can be cooperated to create a virtual three-dimensional map around the robot, as shown in FIG. 3.

When the robot using the map encounters an obstacle protruding from the top or the middle, the robot can approach to the obstacle as close as possible to allow the functional unit 400a to perform the cleaning to provide high cleaning efficiency. If there is an obstacle higher than the robot size, the functions of the robot, for example, cleaning, security checking, etc., can be performed in disregard of the obstacle.

In particular, many variables may arise while a cleaning robot is moving in a large space such as an airport, a terminal, a hospital or the like. Since such a cleaning robot is higher than ordinary household robots, it has to identify the space in three dimensions. To this end, the infrared sensing units 120a to 120d and the ultrasonic sensing units 110a and 110b can sense the height of a protruding obstacle over which the robot can pass and further the depth sensing unit 140a and the LiDAR sensing unit 130a can identify a unction region where the robot can perform the cleaning, thereby increasing the efficiency (e.g., cleaning efficiency) of completion of the function.

Various sensors may be used to sense various protrusions (e.g., higher than BOTTOM_H) placed on the floor surface, such as moldings of electric wires. In particular, data sensed using an ultrasonic wave and data sensed using an infrared rays can be used in combination to identify a functional region where the robot senses a protruding obstacle and approaches to the obstacle and performs the cleaning, thereby improving the cleaning efficiency.

According to one embodiment, an obstacle lower than BOTTOM_H and an obstacle higher than BOTTOM_H can be distinguished from each other. As a result, when an obstacle that can be crossed by the robot is sensed, the robot can enter and perform a function such as cleaning, which will be described in detail later with reference to FIG. 16.

It has been illustrated in FIG. 3 that a map is configured according to the height of a protrusion. Hereinafter, a process of sensing various different protrusions by the robot according to an embodiment of the present disclosure will be described. Description will be given based on the robot of FIG. 4.

Figure 5:
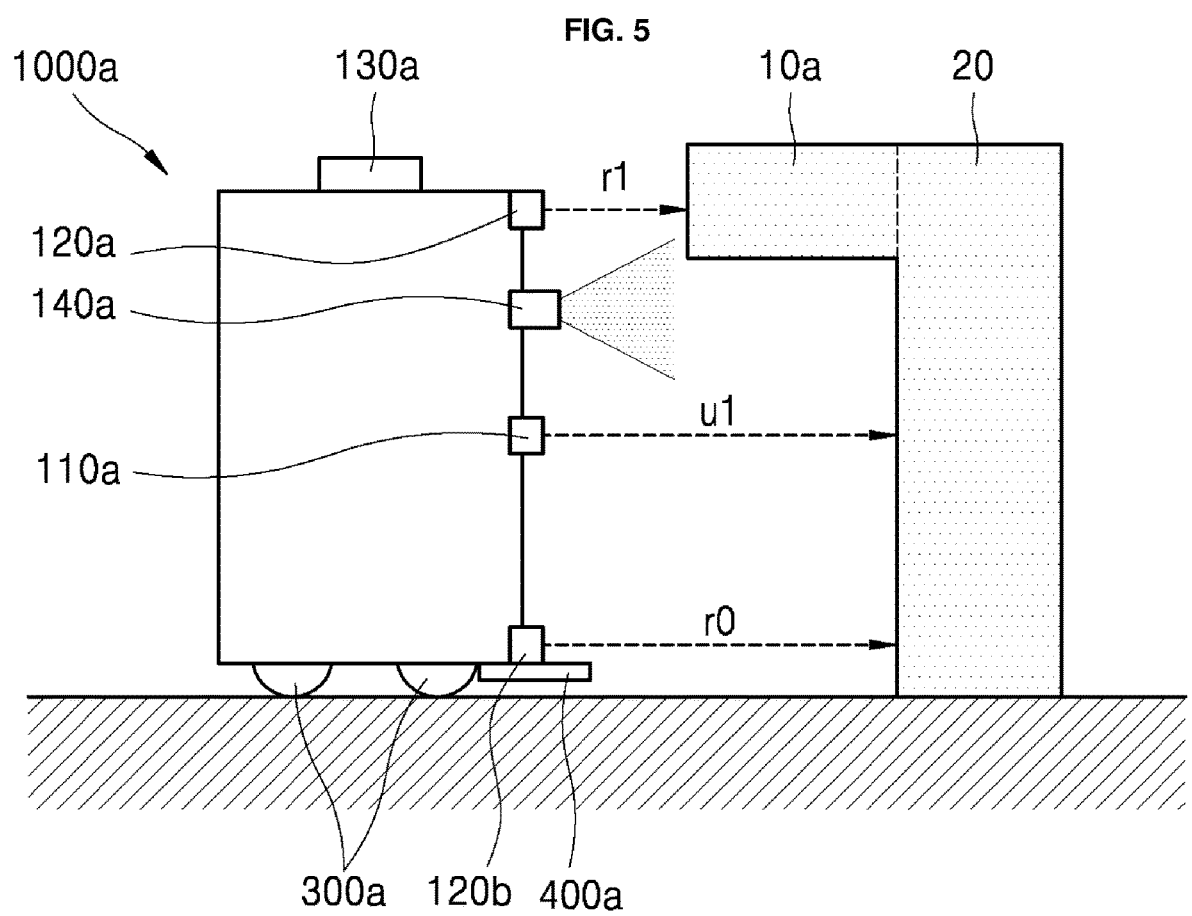
FIGS. 5 and 6 are views for explaining how an infrared sensing unit detects an upper end protrusion according to an embodiment of the present disclosure.
Figure 6:
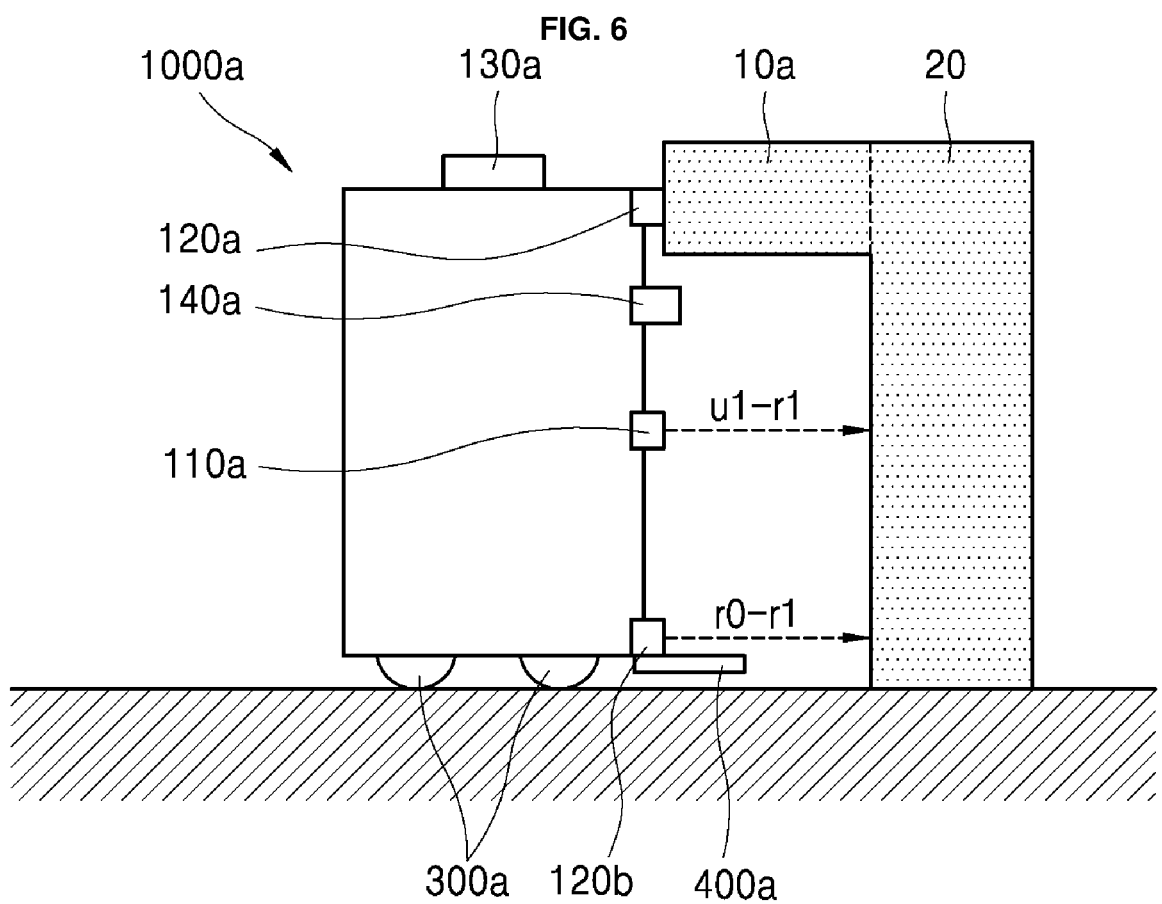

FIGS. 5 and 6 are views for explaining how an infrared sensing unit detects an upper end protrusion according to an embodiment of the present disclosure. Referring to FIG. 5, the infrared sensing units 120a and 120c provided on the upper end of the robot 1000a sense a protrusion 10a located in the traveling direction (moving direction). In one embodiment, a sensed value r1 is a distance between the infrared sensing units 120a and 120c and the protrusion 10a. The sensing data analysis unit 150 may convert the sensed value into distance information between the protrusion 10a and the robot 1000a.

On the other hand, the infrared sensing units 120b and 120d provided at the lower end sense a wall 20 located in the traveling direction. In one embodiment, a sensed value r0 is a distance between the infrared sensing units 120b and 120d and the wall 20.

The ultrasonic sensing units 110a and 110b also sense the wall 20 located in the traveling direction. In one embodiment, a sensed value u1 is a distance between the ultrasonic sensing units 110a and 110b and the wall 20. The sensing data analysis unit 150 may convert the sensed value into distance information between the wall 20 and the robot 1000a. r0 and u1 may have similar values. The depth sensing unit 140a can calculate the depths of the front wall 20 and the protrusion 10a.

If the sensing data analysis unit 150 checks that r1 and u1 are different values, it can be determined that the protrusion is located in front. The depth sensing unit 140a uses the depth information of objects in front. The sensing data analysis unit 150 provides the values sensed by the respective sensing units to the control unit 900.

The control unit 900 uses the map stored in the map storage unit 200 and the position and sensed information of the robot 1000a to check that the protrusion 10a is located. The control unit 900 can also check that the height of the protrusion 10a is a height over which the robot cannot pass, and extend the functional unit (400a in FIG. 4) to perform the corresponding function for a depth (u1-r1) region of the protrusion. For example, the control unit 900 can cause the functional unit 400a to perform a specific function (for example, cleaning, security or the like) after approaching the robot 1000a to the protrusion 10a. As a result, even when the robot 1000a is difficult to access due to the protrusion 10a, the robot 1000a can perform the function such as cleaning.

The control unit 900 may store the protrusion 10a in the map 210 as the upper end protrusion as shown in FIG. 3, by storing height and/or depth information of the protrusion 10a. In one embodiment, the height of the protrusion may be set to TOP_H and the depth of the protrusion may be set to (u1-r1).

FIG. 6 is a view showing an example in which the robot close to the upper protrusion 10a extends the functional unit 400a to perform a predetermined function according to an embodiment of the present disclosure. The robot 1000a uses the infrared sensing units 120a and 120c provided at the upper end and the ultrasonic sensing units 110a and 110b provided at the middle to approach the upper end protrusion 10a. Then, the functional unit 400a is used as it is or the functional unit 400a is extended to perform a predetermined function in a region below the protrusion 10a. In one embodiment, the predetermined function comprises cleaning.

Figure 7:
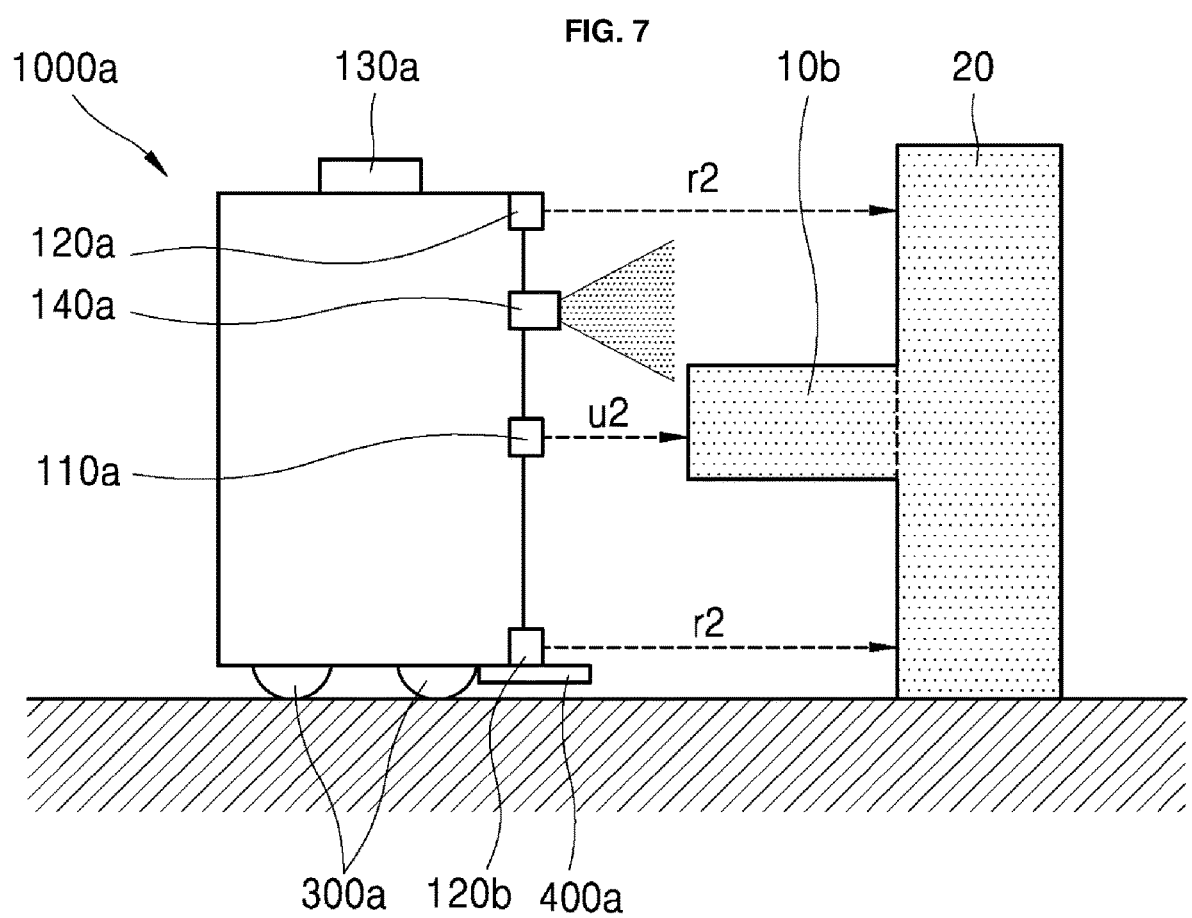
FIG. 7 is a view for explaining how the infrared sensing unit detects a middle protrusion according to another embodiment of the present disclosure.

FIG. 7 is a view for explaining how the infrared sensing unit detects a middle protrusion according to another embodiment of the present disclosure. The ultrasonic sensing units 110a and 110b provided in the middle of the robot 1000a sense a protrusion 10b located in the traveling direction (i.e., moving direction). In one embodiment, a sensed value u2 is a distance between the ultrasonic sensing units 110a and 110b and the protrusion 10b. The sensing data analysis unit 150 may convert the sensed value into distance information between the protrusion 10b and the robot 1000a.

The infrared sensing units 120a and 120c also sense the wall 20 located in the traveling direction (i.e., moving direction). In one embodiment, a sensed value r2 is a distance between the infrared sensing units 120a and 120c and the wall 20. The sensing data analysis unit 150 may convert the sensed value into distance information between the wall 20 and the robot 1000a. The depth sensing unit 140a can calculate the depths of the front wall 20 and the protrusion 10b.

If the sensing data analysis unit 150 checks that r2 and u2 are different values, it can be determined that the protrusion is located in front. The depth sensing unit 140a uses the depth information of objects in front. The sensing data analysis unit 150 provides the values sensed by the sensing units to the control unit 900.

The control unit 900 uses the map stored in the map storage unit 200 and the position and sensed information of the robot 1000a to check that the protrusion 10b is located. The control unit 900 can also check that the height of the protrusion 10b is a height over which the robot cannot pass, and extend the functional unit (400a in FIG. 4) to perform the corresponding function for a depth (r2-u2) region of the protrusion. For example, the control unit 900 can cause the functional unit 400a to perform a specific function (for example, cleaning, security or the like) after approaching the robot 1000a to the protrusion 10b. As a result, even when the robot 1000a is difficult to access due to the protrusion 10b, the robot 1000a can perform the function such as cleaning.

The control unit 900 may store the protrusion 10a in the map 210 as the middle protrusion as shown in FIG. 3. In one embodiment, the height of the protrusion may be set to (TOP_H-BOTTOM_H) and the depth of the protrusion may be set to (r2-u2).

The infrared sensing units 120b and 120d at the lower end in FIGS. 5 to 7 may also continuously sense a distance to the wall 20. The distance to the wall 20 sensed by the infrared sensing units 120b and 120d at the lower end in FIG. 5 may be equal to u1, the distance to the wall 20 sensed by the infrared sensing units 120b and 120d at the lower end in FIG. 6 may be equal to u1-r1, and the distance to the wall 20 sensed by the infrared sensing units 120b and 120d at the lower end in FIG. 7 may be equal to r2. However, slight differences may occur depending on the structure of the front of the robot 1000a, but may be corrected by the sensing data analysis unit 150.

Figure 8:
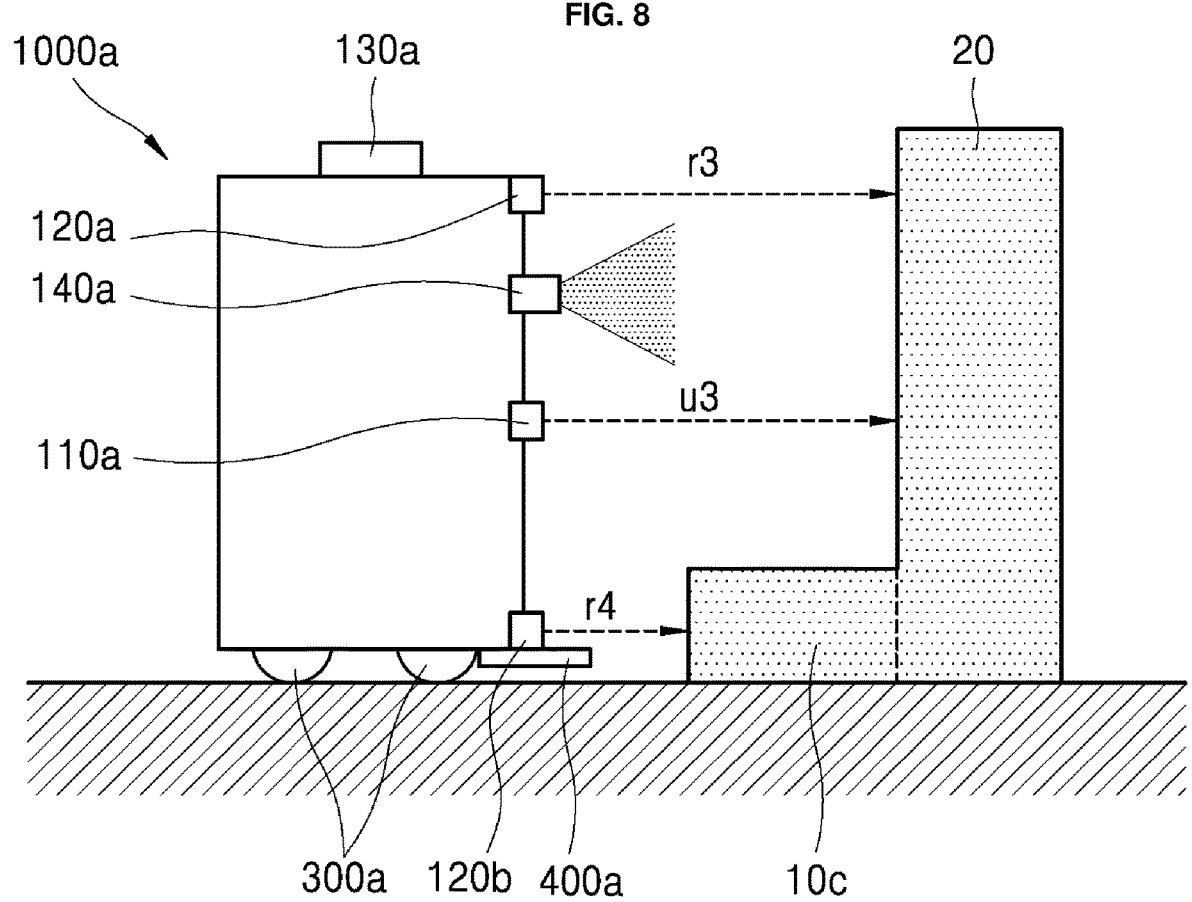
FIGS. 8 and 9 are views for explaining how the infrared sensing unit detects a lower end protrusion according to still another embodiment of the present disclosure.
Figure 9:
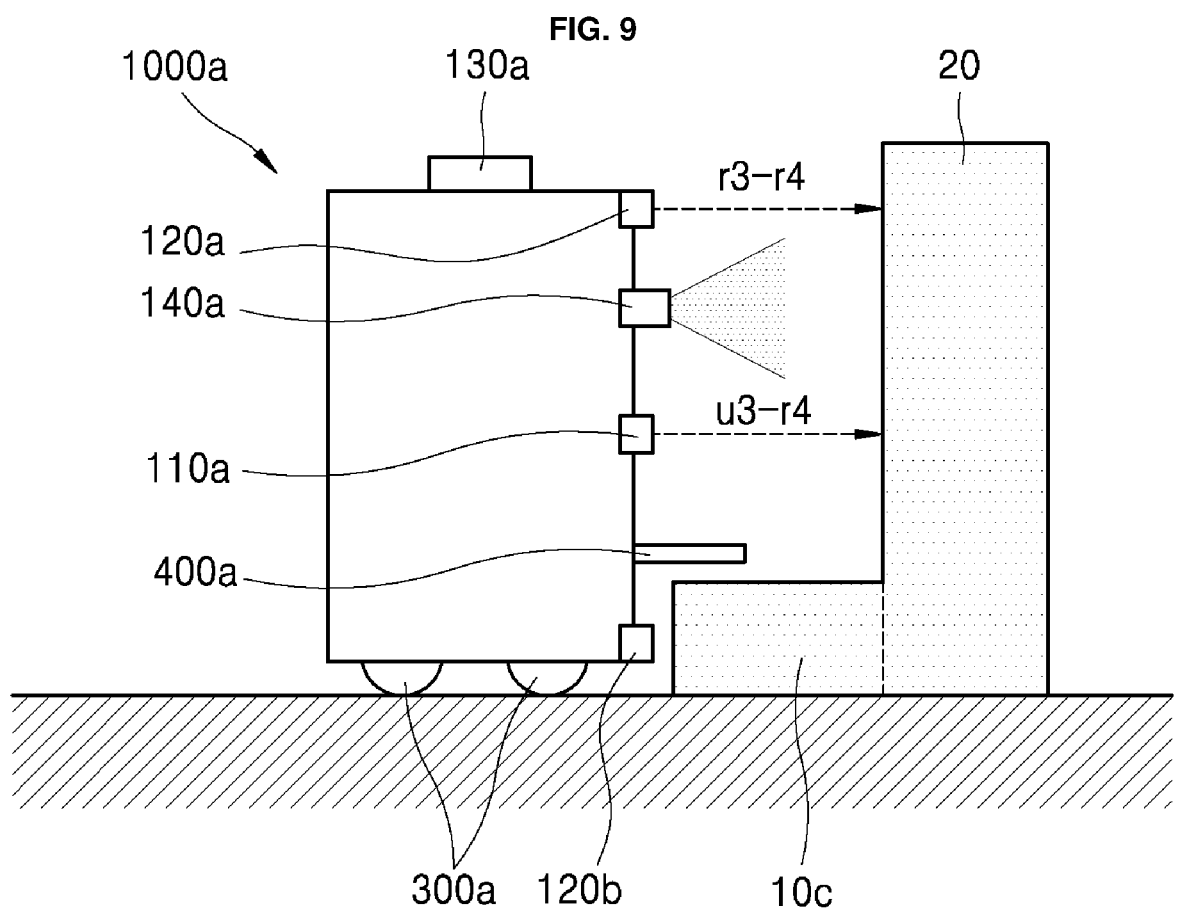

FIGS. 8 and 9 are views for explaining how the infrared sensing unit detects a lower end protrusion according to still another embodiment of the present disclosure. In FIG. 8, the infrared sensing units 120a and 120c provided at the upper end of the robot 1000a and the ultrasonic sensing units 110a and 110b provided in the middle of the 1000a sense the wall 20 located in the traveling direction (i.e., moving direction).

In one embodiment, sensed values r3 and u3 are distances between the respective sensing units and the wall 20. The sensing data analysis unit 150 may convert the sensed values into distance information between the protrusion 10b and the robot 1000a.

On the other hand, the infrared sensing units 120b and 120d provided at the lower end sense a protrusion 10c located in the traveling direction (i.e., moving direction). In one embodiment, a sensed value r4 is a distance between the infrared sensing units 120b and 120d and the protrusion 10c. The sensing data analysis unit 150 may convert the sensed value into distance information between the protrusion 10c and the robot 1000a. The depth sensing unit 140a can calculate the depths of the front wall 20 and the protrusion 10c.

If the sensing data analysis unit 150 checks that r3 and u3 are the same or substantially same values and r4 is a value different from r3 and u3, it can be determined that the projection 10c is located at the lower end. The depth sensing unit 140a uses the depth information of objects in front. Particularly, it can be determined that the protrusion 10c is located at the lower end by using the previously stored value of the depth sensing unit 140a and reflecting the depth information stored before the depth sensing unit 140a approaches the protrusion 10c.

The sensing data analysis unit 150 provides the values sensed by the respective sensing units to the control unit 900. The control unit 900 uses the map stored in the map storage unit 200 and the position and sensed information of the robot 1000a to check that the protrusion 10c is located. In addition, the control unit 900 can check that the height (BOTTOM_H) of the projection 10c is a height over which the robot cannot pass, and can approach the robot to the projection 10c considering the depth (r3-r4) of the projection.

That is, the embodiment of FIG. 8 can be applied to solve a problem that the robot advances to the protrusion 10c since the robot 1000a only senses the wall 20 and cannot sense the protrusion 10c provided at the lower end. In particular, the functional unit 400a may be extended using an arm provided on the lower surface of the robot, such as a brush or a mop. When the protrusion 10c at the lower end is not sensed, the arm may be broken. Alternatively, the functional unit 400a may be moved to a position higher than the height of the protrusion 10c at the lower end to perform a predetermined function.

FIG. 9 is a view showing an example in which the robot close to the lower end protrusion 10c is moved or extended to perform a predetermined function according to an embodiment of the present disclosure. The robot 1000a uses the infrared sensing units 120a and 120c located at the upper end, the ultrasonic sensing units 110a and 110b located in the middle, and the infrared sensing units 120b and 120d located at the lower end to approach to the lower end protrusion 10c. Then, the functional unit 400a is extended or moved upward to perform a predetermined function on the protrusion 10c. In one embodiment, the predetermined function comprises cleaning.

The embodiments of FIGS. 5 to 9 are summarized as follows. The first infrared sensing units 120a and 120c are provided at the upper end of the robot so as to sense a distance to an object located outside at the height of TOP_H. The second infrared sensing units 120b and 120d is provided at the lower end of the robot so as to sense a distance to an object located outside at the height of BOTTOM_H.

The ultrasonic sensing units 110a and 110b are provided at a position higher than the first infrared sensing units 120a and 120c and higher than the second infrared sensing units 120b and 120d so as to sense a distance to an object located outside. The depth sensing unit 140a senses the depths of one or more objects in front of the object. Then, the sensing data analysis unit 150 can analyze a difference between the values sensed by the sensing units. The analyzed difference is delivered to the control unit 900. The control unit 900 uses the values (r1 to r4, u1 to u3, etc.) sensed by the sensing units and stores the information of protrusions in the map storage unit 200 based on a difference between these values.

According to an embodiment of the present disclosure, when the functional unit 400a is provided at the lower end of the robot to provide the function of cleaning the floor, the control unit 900 can control the functional unit 400a to perform the cleaning function for the region of the floor corresponding to the depth of the protrusion.

In FIGS. 5 and 6, r1<u1, and the depth information (u1-r1) of the protrusion can be stored. In FIG. 7, u2<r2, and the depth information (u2-r2) of the protrusion can be stored (r2-u2). In FIGS. 8 and 9, since r4<r3 and r4<u3, the depth information (r3-r4) or (u3-r4) of the protrusion can be stored. In addition, the control unit 900 can store information on location of the protrusions at the upper end/middle/lower end in the map storage unit 200.

Information on the degree of protrusion of the protrusion and the height (upper end, middle and lower end) of the protrusion can be stored in the map 210 as shown in FIG. 3. In particular, the protrusions of FIGS. 5-9 are all in the form attached to the fixed object, i.e., the wall 20. Thus, the degree of protrusion of the protrusion can be stored in relation to the fixed object (wall) on the map. On the other hand, when the depth of the protrusion is smaller than the unit region of the map, the combined value of the height information and the depth information can be stored in the map.

Figure 10:
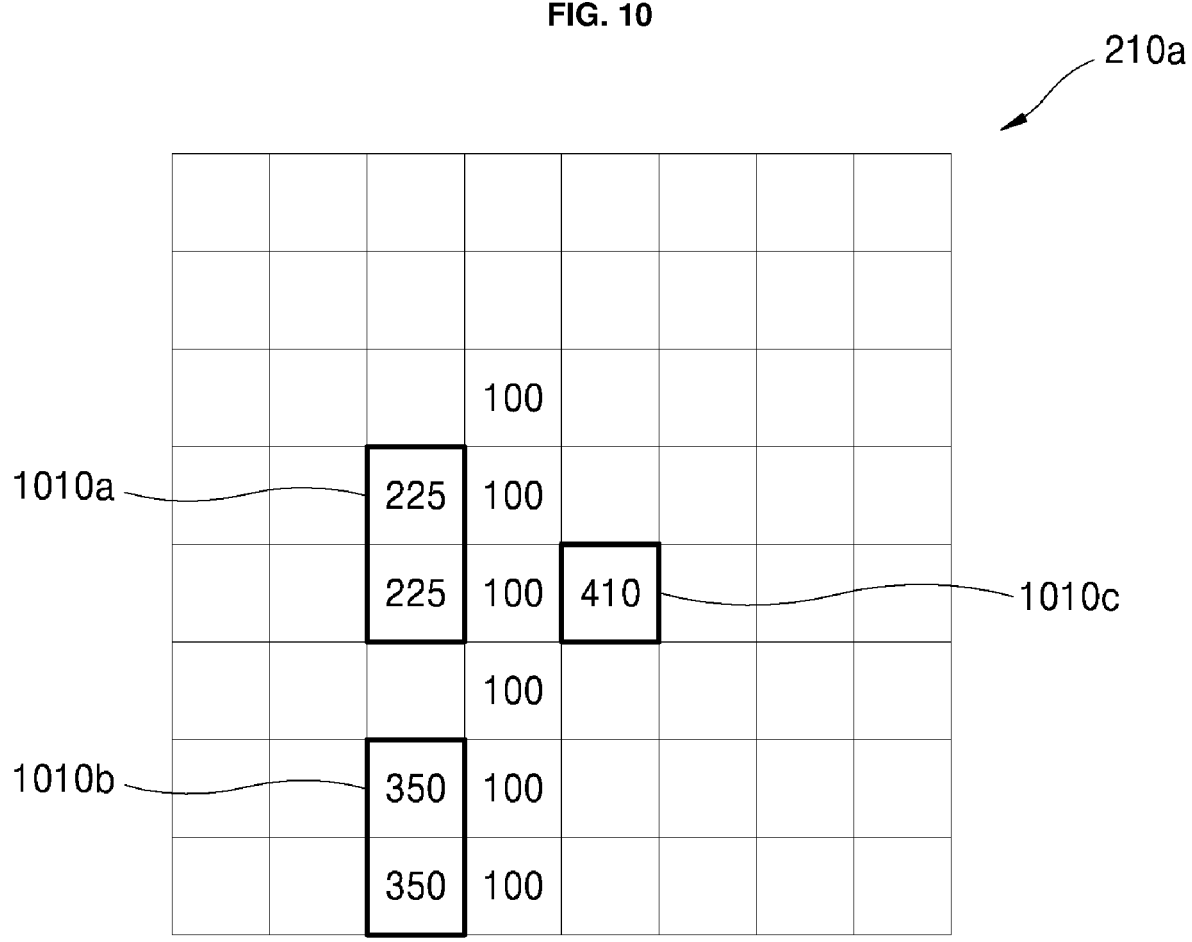
FIG. 10 is a view showing a map in which information of protrusions is stored according to an embodiment of the present disclosure.

FIG. 10 is a view showing a map in which information of protrusions is stored according to an embodiment of the present disclosure. FIG. 10 shows a three-dimensional map of obstacles such as protrusions and walls in a region where the robot moves.

In one embodiment, a number 100 indicates a structure such as a fixed wall. A unit region is one meter (1 m). Hundred digits ("2", "3", and "4") of numbers 200, 300 and 400 indicate an upper end protrusion, a middle protrusion and a lower end protrusion, respectively. Alternatively, the group portion shown in Table 1 may be set to hundred digits of numbers.

Let the depth of a protrusion have a ten-digit value as a unit length ratio with respect to a wall. For example, if the upper end protrusion is 25 cm-deep with respect to the wall, the upper end protrusion has a value of 225. A value of the depth (u1-r1) of the protrusion 10a in FIGS. 5 and 6 can be calculated on the basis of the unit region (1 meter) and can be reflected to store the height and depth of the protrusion numerically in the map storage unit 200 (see 1010a).

Likewise, if the middle protrusion is 50 cm-deep with respect to the wall, the middle protrusion has a value of 350. A value of the depth (r2-u2) of the protrusion 10b in FIG. 7 can be calculated on the basis of the unit region (1 meter) and can be reflected to store the height and depth of the protrusion numerically in the map storage unit 200 (see 1010b).

Likewise, if the lower end protrusion is 10 cm-deep with respect to the wall, the lower end protrusion has a value of 410. A value of the depth (r3-r4 or u3-r4) of the protrusion 10c in FIGS. 8 and 9 can be calculated on the basis of the unit region (1 meter) and can be reflected to store the height and depth of the protrusion numerically in the map storage unit 200 (see 1010c).

To sum up, in the case of a protrusion adjacent to the wall, the robot according to an embodiment of the present disclosure can store a distance to the wall, that is, the depth and height information of the protrusion in the map 210a. This information can be provided to other robots or servers. In one embodiment, the height and depth information of the protrusion may be included in one number. Alternatively, one of the height information and the depth information may be indicated by an English alphabet. This shows that single data on the map includes a combination of the height information and the depth information of the protrusion, thereby facilitating storing various information on the protrusion without increasing the size of the map data.

The above embodiment of the present disclosure can be applied to a robot operated in a large area such as an airport or a terminal. In one embodiment, the robot may be a big-sized autonomous mobile robot and may contain an algorithm for determining a travelable region using a map. In addition, the data calculated by the above-described various sensing units can be used to create or update a three-dimensional map of an obstacle around the robot as shown in FIG. 10.

In one embodiment, the height of each obstacle can be checked through the sensing module 100 and the height information can be stored in the map. Thus, the robot can perform special functions (e.g., cleaning, security, guidance and so on) suitable for the height of the obstacle. Particularly, when a region where the robot can perform a function is secured according to the height of the obstacle, the function can be performed in the secured region, thereby improving the functional efficiency of the robot in the whole space.

Figure 11:
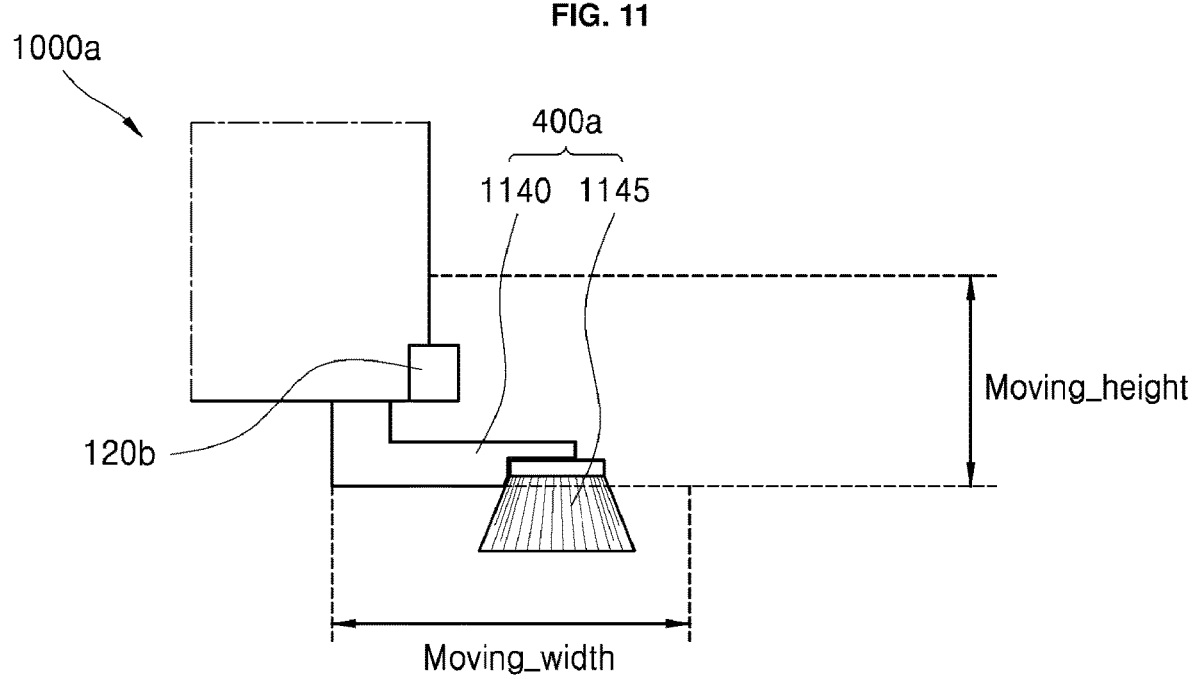
FIG. 11 is a view showing a functional unit according to an embodiment of the present disclosure.

FIG. 11 is a view showing a functional unit according to an embodiment of the present disclosure, in which the moving unit 300a or other components are not shown for convenience of explanation. This figure shows an enlargement of the lower end of the robot 1000a. In the present disclosure, the functional unit 400a comprises an arm 1140 movable up and down or left and right to perform a cleaning function. If the moving unit 300a cannot enter the above-mentioned functional region, the control unit 900 can control the arm 1140 to extend to perform a cleaning function in the functional region. The more detailed description will be given as follows.

The functional unit 400a for performing the cleaning comprises an arm 1140 movable up and down or right and left and a cleaning unit (or cleaning head) 1145 attached to the arm 1140 for sucking dusts and dirt on the floor into the robot 1000a. The arm 1140 cannot enter due to the protrusion, but, if the controller 900 of the robot 1000a can identify a functional region that can be cleaned below the protrusion, the arm 1140 can perform the cleaning in the functional region.

The arm 1140 is movable up and down by "Moving_height". In addition, the arm 1140 can move back and forth or right and left by "Moving_width". Accordingly, in the presence of a lower end protrusion, the arm 1140 can be adjusted up and down to perform the cleaning function. Further, when a middle protrusion or an upper end protrusion is present and the robot cannot enter, the arm 1140 may be adjusted right and left or back and forth to perform the cleaning function.

A functional region can be determined based on a back and forth or right and left extendable length of the arm 1140 and the height and depth of the protrusion. An embodiment in which the arm 1140 can be extended up to 30 cm with respect to the front of the robot will be mainly described below.

In FIG. 10, the depth of the protrusion indicated by 1010a is 25 cm. Therefore, portions below the protrusion can be cleaned through the extension of the arm 1140. In FIG. 10, the depth of the protrusion indicated by 1010b is 50 cm. Therefore, of the portions below the protrusion, a region away by 20 cm from the wall is a functional region, which can be cleaned by the extension of the arm 1140.

On the other hand, when the arm 1140 can be extended up to 30 cm with respect to the floor of the robot, the height of the arm 1140 with respect to the protrusion indicated by 1010c in FIG. 10 can be adjusted for cleaning.

After the robot performs the cleaning function on the functional region calculated in combination of the depth and height of the protrusion and the expandable region of the arm 1140, information on a region (for example, a region away by 20 cm from the protrusion 1010b to the wall) that has not yet been cleaned is transmitted to a server which can then confirm that the cleaning has not been completed in the corresponding area. For this purpose, the control unit 900 may separately store a map of a cleaned space.

As shown in FIG. 11, in consideration of the expansion or movable range of the arm 1140 and the depth of the protrusion, the robot 1000a can change its direction by moving the moving unit 300. For example, as shown in FIG. 4, when a robot in which the functional unit 400a is provided on the left front side senses a protrusion in the course of going straight in its travelling direction (i.e., moving direction), the robot can change its travelling direction (i.e., moving direction) to allow the functional unit 400a to widen the functional region in the lower end region of the protrusion. For example, the robot may make a right turn in the straight forward direction to allow the functional unit 400a of the robot to approach the lower end of the protrusion more deeply.

Figure 12:
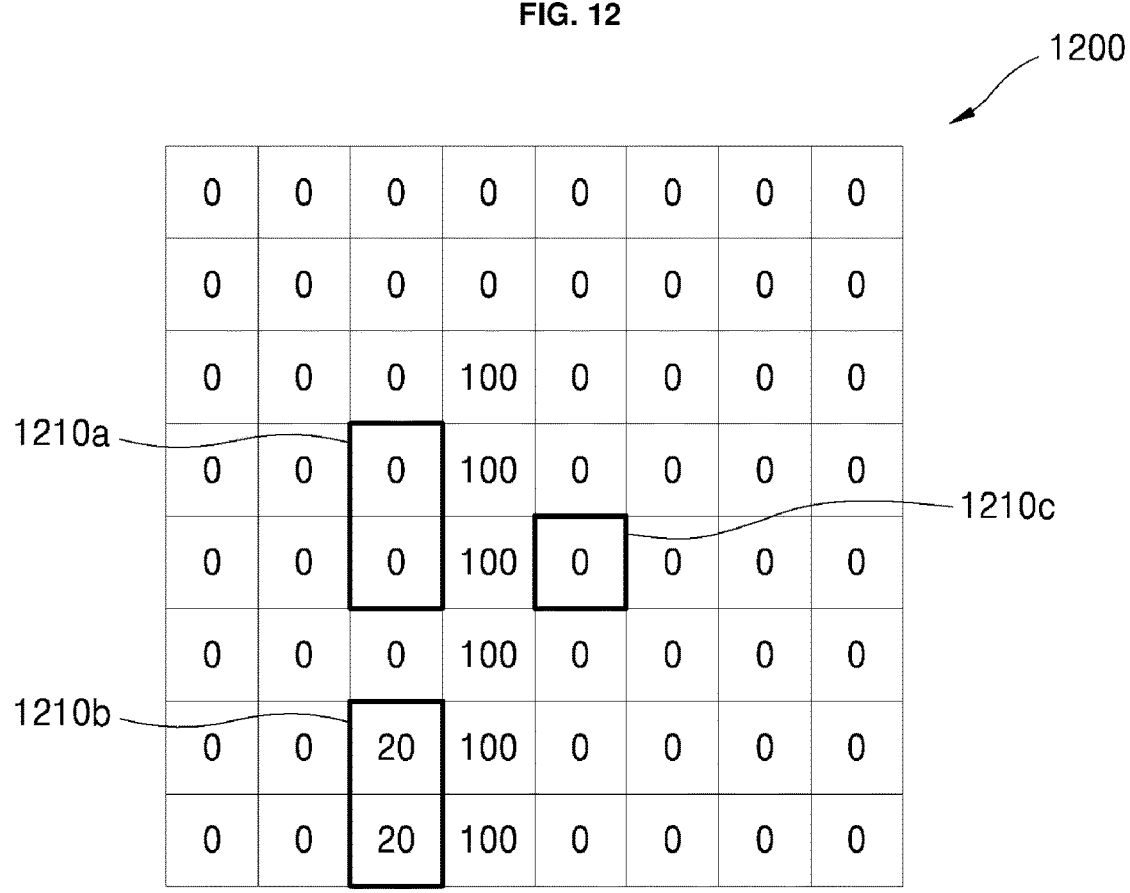
FIG. 12 is a view showing a map of a cleaned region according to an embodiment of the present disclosure.

FIG. 12 is a view showing a map of a cleaned region according to an embodiment of the present disclosure. The map 1200 of FIG. 12 is a map of a kind different from the map in which the obstacle of FIG. 10 or FIG. 3 is registered. The map 1200 of FIG. 12 is a map for a cleaned region and stores a value of 0 for a cleaned space. A space such as a wall that is inaccessible is set to 100. In addition, for the protrusions of FIG. 10, the state of being cleaned is shown, as indicated by 1210a, 1210b and 1210c, respectively.

More specifically, as indicated by 1210a, it can be confirmed that the floor of the protrusion indicated by 1010a in FIG. 10 has been cleaned. Likewise, as indicated by 1210c, it can be confirmed that a value of 0 is stored and the cleaning has been completed for the lower end protrusion indicated by 1010c in FIG. 10.

On the other hand, as indicated by 1210b, it can be confirmed that the floor of the protrusion indicated by 1010b in FIG. 10 has not yet been cleaned. A number 20 (e.g., the protrusion distance of 50 minus a movement 30 of the functional unit 400) indicates that a region away by 20 cm from the wall has not yet been cleaned.

To summarize FIGS. 10 to 12, when a protrusion is sensed, the control unit 900 of the present disclosure checks a functional region in which a predetermined function can be performed below the protrusion, and moves the functional unit 400a up and down, back and forth, or right and left to complete the function such as cleaning in the corresponding functional region. A region that has been cleaned and a region that has not yet been cleaned are separately stored in an additional map which is then is transmitted to the server.

Figure 13:
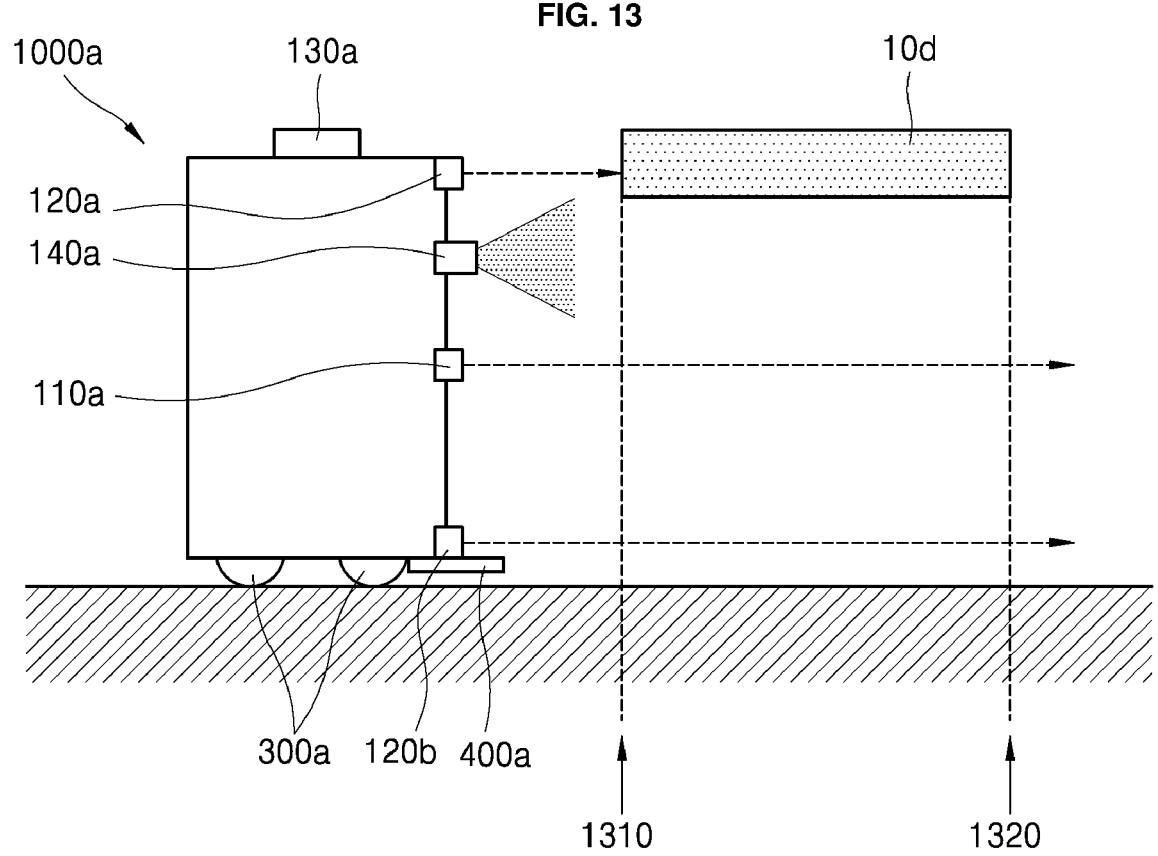
FIGS. 13 to 15 are views for explaining how to sense a protrusion in a space having an unidentifiable wall according to another embodiment of the present disclosure.
Figure 14:
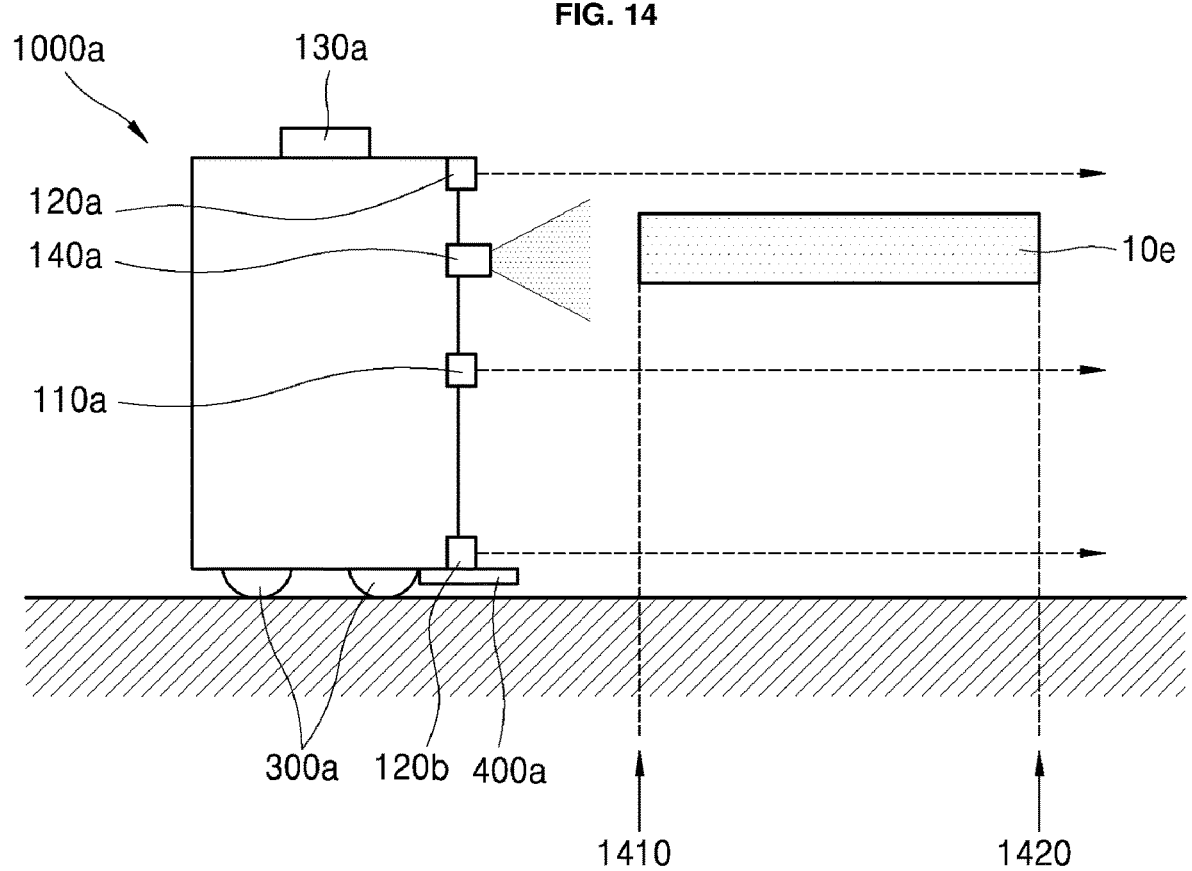
Figure 15:
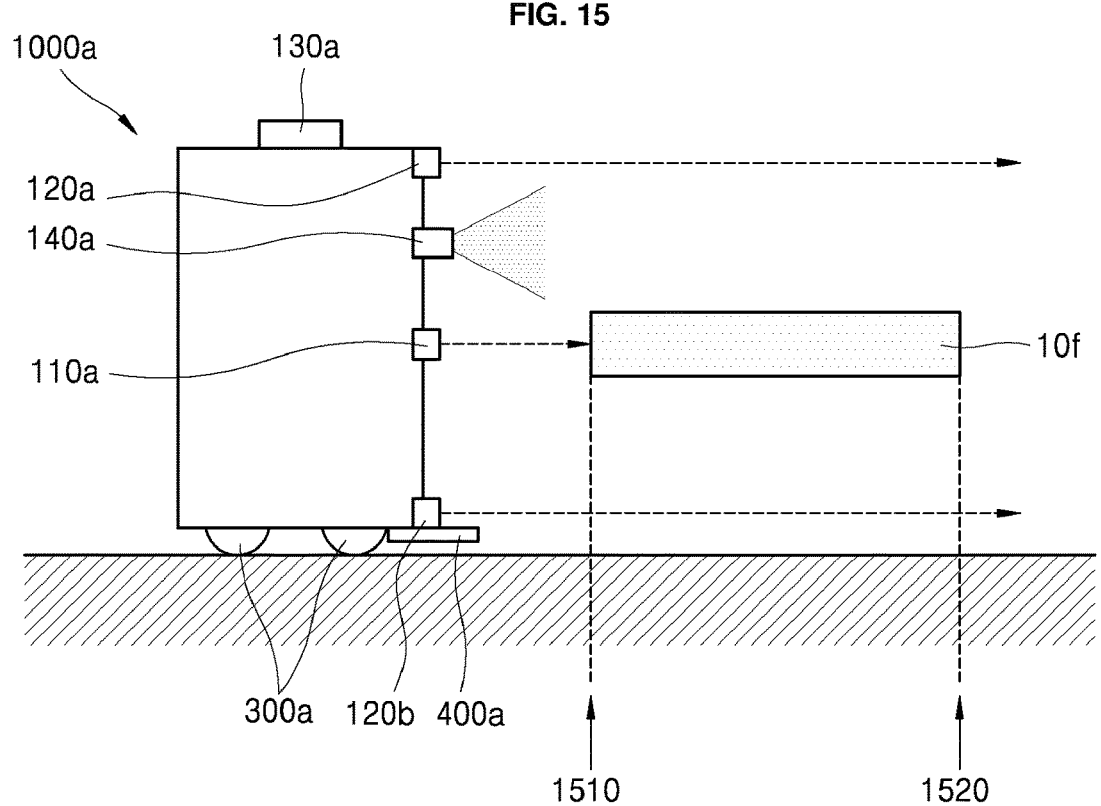

FIGS. 13 to 15 are views for explaining how to sense a protrusion in a space having an unidentifiable wall according to another embodiment of the present disclosure. The configuration of the robot 1000a is the same as that described above. A protrusion may be located on the front side, as indicated by 10d, 10e and 10f in FIGS. 13 to 15. In one embodiment, a protrusion located independently of a wall may be, for example, a table such as a desk, or a bar provided on the upper side of a barrier. The independence from the wall means that there is no wall within a certain range in which the infrared/ultrasonic/depth sensing units can sense an obstacle in the right and left side with respect to the traveling direction (i.e., moving direction) of the robot. FIGS. 13 to 15 are not limited to a case where no wall is present.

In FIGS. 13 to 15, it is difficult to check the depth of the protrusion 10f. However, it may be possible for the robot to approach the protrusion 10f as much as possible in order to extend the functional unit or adjust the position of the functional unit to perform a preset function.

Referring to FIG. 13, the upper end infrared sensing units 120a and 120c sense the protrusion 10d and the lower end infrared sensing units 120b and 120d and ultrasonic sensing units 110a and 110b sense no obstacle. The depth sensing unit 140a senses the depth of the protrusion 10d and uses the sensed depth to sense that the protrusion 10d independent of the wall is located in front. Then, the robot 1000a approaches to a front region 1310 of the protrusion 10d to perform a predetermined function. In this process, the position of the protrusion 10d can be stored in the map. Since there is no wall, information on the depth (width) of the protrusion cannot be known. Therefore, only the height information of the protrusion can be stored in the map. In addition, a map for a region where the function such as cleaning has been performed may be stored as shown in FIG. 12.

Thereafter, when the robot 1000a moves to the opposite side 1320 along the periphery of the protrusion 10d, the depth information of the protrusion can be calculated using the information on the map of the protrusion previously stored and a moving distance of the robot. This calculated depth information can be used to update the depth information of the protrusion onto the map.

Referring to FIG. 14, the infrared sensing units 120a to 120d and the ultrasonic sensing units 110a and 110b sense no obstacle. However, the depth sensing unit 140a senses the depth of the protrusion 10e and uses the sensed depth to sense that the protrusion 10e independent of the wall is located in front. Then, the robot 1000a approaches to a front region 1410 of the protrusion 10e to perform a predetermined function. In this process, the position of the protrusion 10d can be stored in the map. Since there is no wall, information on the depth (width) of the protrusion cannot be known. Therefore, only the height information of the protrusion can be stored in the map. In addition, a map for a region where the function such as cleaning has been performed may be stored as shown in FIG. 12.

Thereafter, when the robot 1000a moves to the opposite side 1420 along the periphery of the protrusion 10e, the depth information of the protrusion can be calculated using the information on the map of the protrusion previously stored and a moving distance of the robot. This calculated depth information can be used to update the depth information of the protrusion onto the map.

Referring to FIG. 15, the infrared sensing units 120a to 120d sense no obstacle. However, the ultrasonic sensing units 110a and 110b sense the protrusion 10f in front. The depth sensing unit 140a senses the depth of the protrusion 10f and uses the sensed depth to sense that the protrusion 10f independent of the wall is located in front. Then, the robot 1000a approaches to a front region 1510 of the protrusion 10f to perform a predetermined function. In this process, the position of the protrusion 10f can be stored in the map. Since there is no wall, information on the depth (width) of the protrusion cannot be known. Therefore, only the height information of the protrusion can be stored in the map. In addition, a map for a region where the function such as cleaning has been performed may be stored as shown in FIG. 12.

Thereafter, when the robot 1000a moves to the opposite side 1520 along the periphery of the protrusion 10f, the depth information of the protrusion can be calculated using the information on the map of the protrusion previously stored and a moving distance of the robot. This calculated depth information can be used to update the depth information of the protrusion onto the map.

Figure 16:
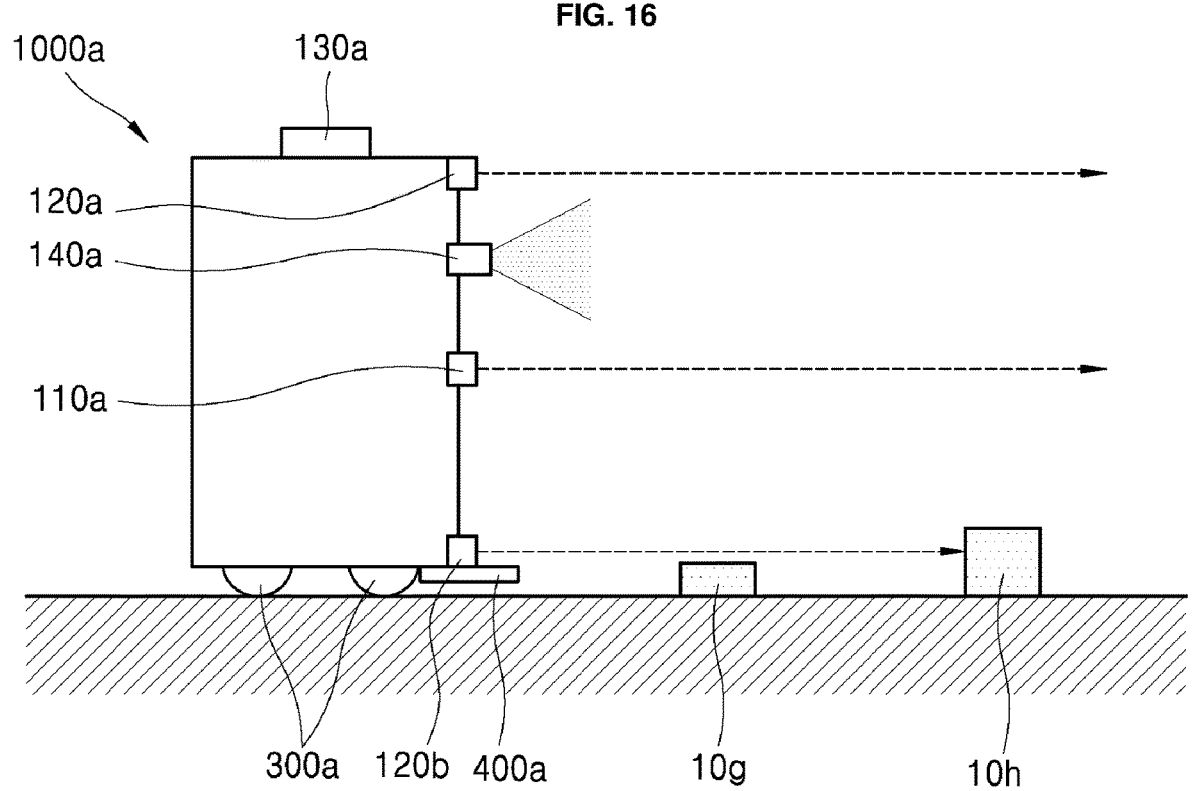
FIG. 16 is a view for explaining how to sense a protrusion on a floor according to an embodiment of the present disclosure.

FIG. 16 is a view for explaining how to sense a protrusion on a floor according to an embodiment of the present disclosure. Two projections 10g and 10f are located in the traveling direction (i.e., moving direction) of the robot. In one embodiment, a protrusion of the floor is a molded electric wire.

The robot can pass over a protrusion lower than BOTTOM_H. Accordingly, the infrared sensing units 120b and 120d at the lower end can be used to identify the protrusions located at the lower end. In FIG. 16, the first protrusion 10g is not sensed by the infrared sensing units 120b and 120d. This means that the robot 1000a can pass over the first protrusion 10g. The second protrusion 10h after the first protrusion 10g is sensed by the infrared sensing units 120b and 120d. This means that the robot 1000a cannot pass over the second protrusion 10h. Accordingly, the robot 1000a can approach to the second protrusion 10f to a predetermined cleaning function. Information on the second protrusion 10f can be stored in the map.

Figure 17:
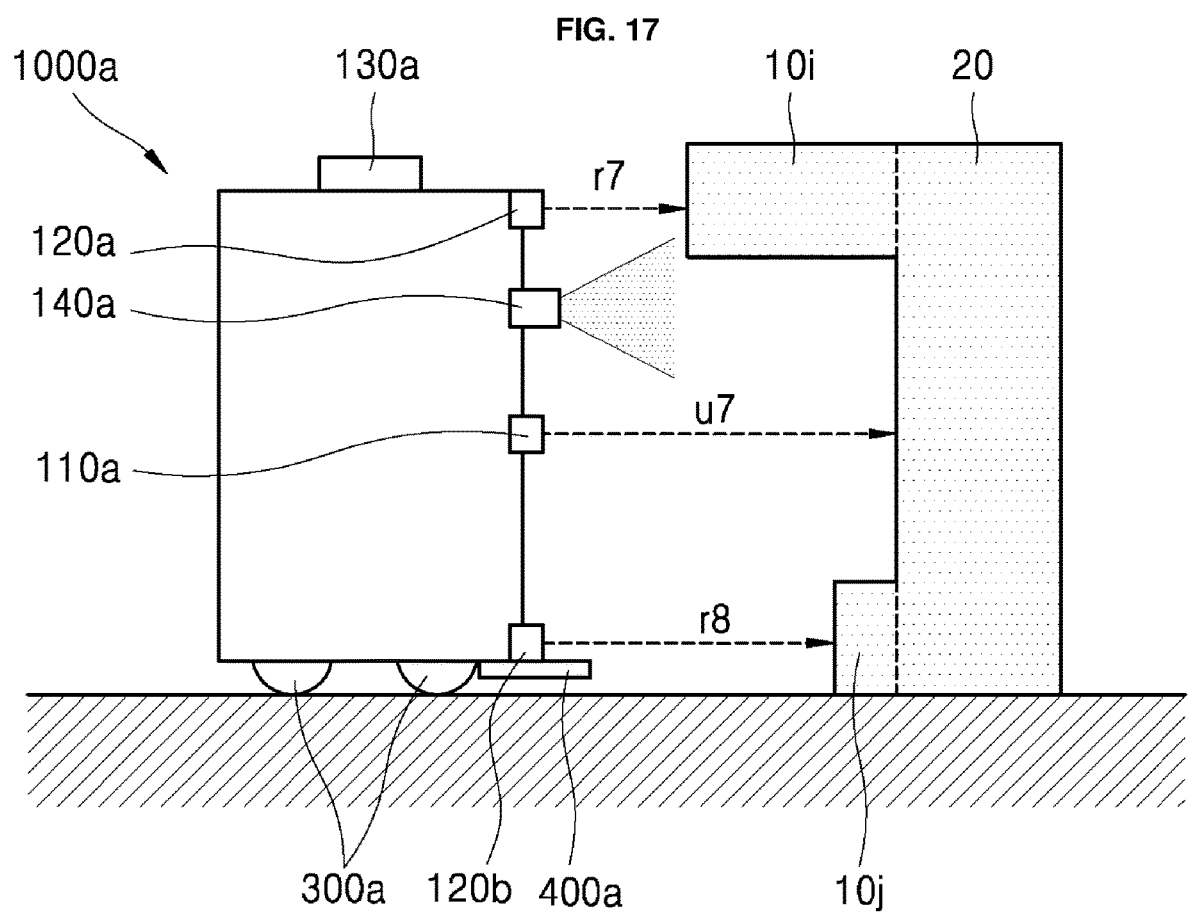
FIG. 17 is a view showing a case where a distance to an upper protrusion is different from a distance to a lower end protrusion according to an embodiment of the present disclosure.

FIG. 17 is a view showing a case where a distance to an upper protrusion is different from a distance to a lower end protrusion according to an embodiment of the present disclosure. Two projections 10i and 10j are located in the traveling direction (i.e., moving direction) of the robot. A distance to the first projection 10i which is sensed by the upper end infrared sensing units 120a and 120c is r7, a distance to the second projection 10j which is sensed by the lower end infrared sensing units 120b and 120d is r8, and a distance to the wall 20 which is sensed by the middle ultrasonic sensing units 110a and 110b is u7. The control unit 900 can use a combination of the sensed distances to check whether or not a function such as cleaning can be performed for a region of r8-r7. If the value of r8-r7 is smaller than the length of extension of the functional unit 400a, the function can be completed for the floor part below the first projection 10i. On the other hand, if the value of r8-r7 is larger than the length of extension of the functional unit 400a, the function can be completed only for a portion of the floor part of the first projection 10i.

Figure 18:
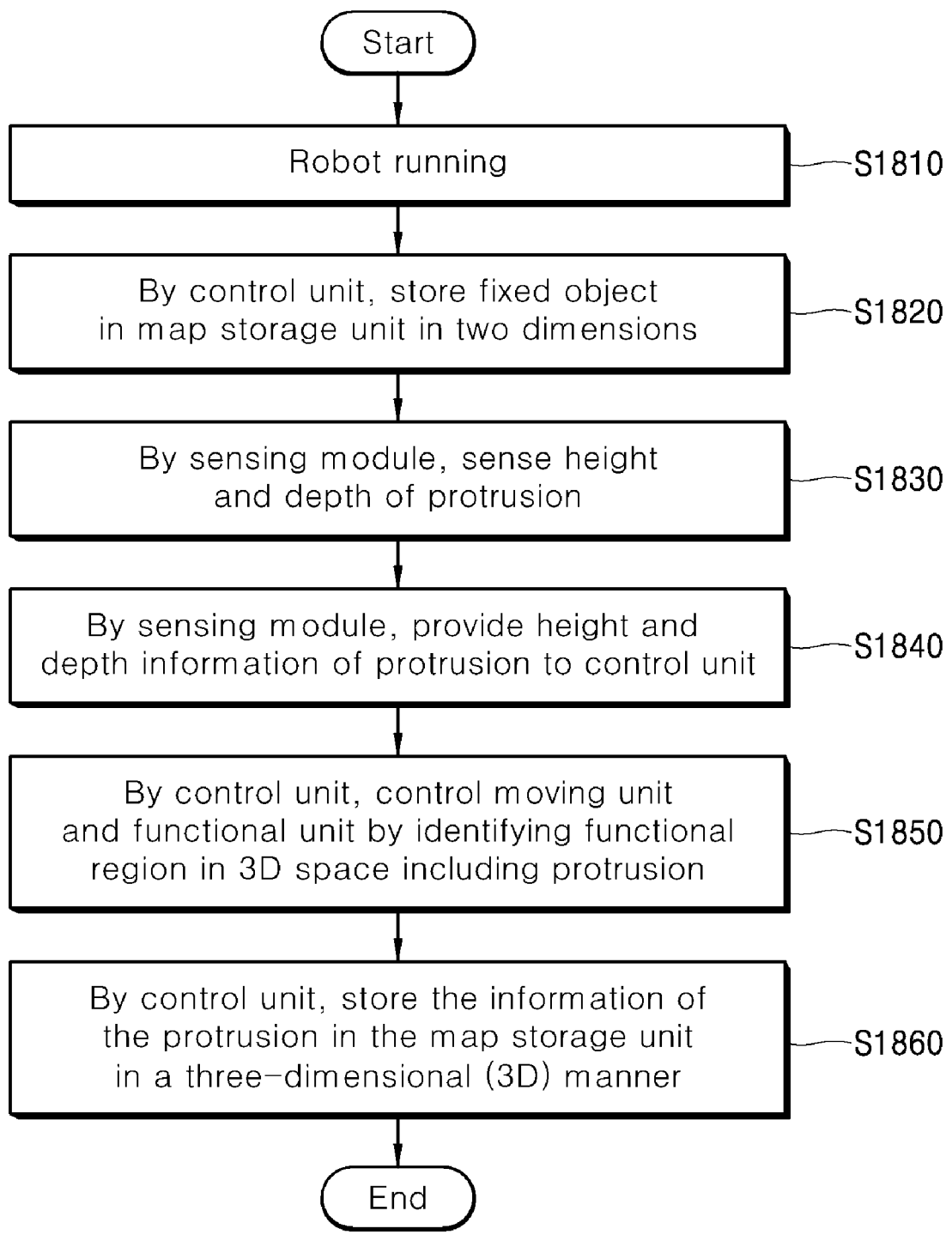
FIG. 18 is a flowchart showing a process in which each component of the robot senses a protrusion and operates in response to the sensing according to an embodiment of the present disclosure.

FIG. 18 is a flowchart showing a process in which each component of the robot senses a protrusion and operates in response to the sensing according to an embodiment of the present disclosure. Refer to the above-described components of the robot. The robot maintains a running state (S1810). In this process, the control unit may selectively store position information of a fixed object in the map storage unit in two dimensions (S1820). For example, the control unit may use the LiDAR sensing unit 130 to the position information of the fixed object such as a wall or glass around the robot in the map storage unit (S1820). The fixed object position information may be stored in three dimensions. For example, the infrared sensing unit 120 and the ultrasonic sensing unit 110 described above may be used to store the fixed object position information in three dimensions. The step S1820 may be performed only when the robot is running for the first time, or may be performed at every running. If the position information of the fixed object such as a wall is changed or differed at every running, it is updated in the map storage unit.

Thereafter, the sensing module senses the height and depth of the protrusion in the traveling process of the robot (S1830). The sensing module 100 or the sensing data analysis unit 150 configuring the sensing module 100 may provide the height and depth information of the protrusion to the control unit (S1840). Thereafter, the control unit may compare the height and depth information of the protrusion and the information (information of the fixed object or the previously sensed protrusion, etc.) stored in the map storage unit to identify a functional region in the three-dimensional space including the protrusion and control the moving unit and the functional unit.

More specifically, depending on the depth of the protrusion, it can be identified whether the lower end region of the protrusion can be operated by extending the functional unit or whether the upper end region of the protrusion can be operated by vertically moving the functional unit. The embodiment of controlling the functional unit has been shown and described in FIGS. 6, 9 and 11. Thereafter, the control unit stores the information of the protrusion in the map storage unit in a three-dimensional (3D) manner (S1860). Storing the information in a 3D manner means that the height information and depth information of the protrusion are reflected and stored.

In addition, when there is a lower region of the protrusion other than the identified functional region, information on a space in which the functional unit does not operate can be stored in a separate map. As shown in FIG. 12, information on a region (indicated by 1210b in FIG. 2) where the protrusion has a deep depth and the functional unit of the robot is extended or moved not to perform a function such as cleaning may be stored in the map, so that a server or a central control center can determine that there is a need to take separate measures for the corresponding region.

Figure 19:
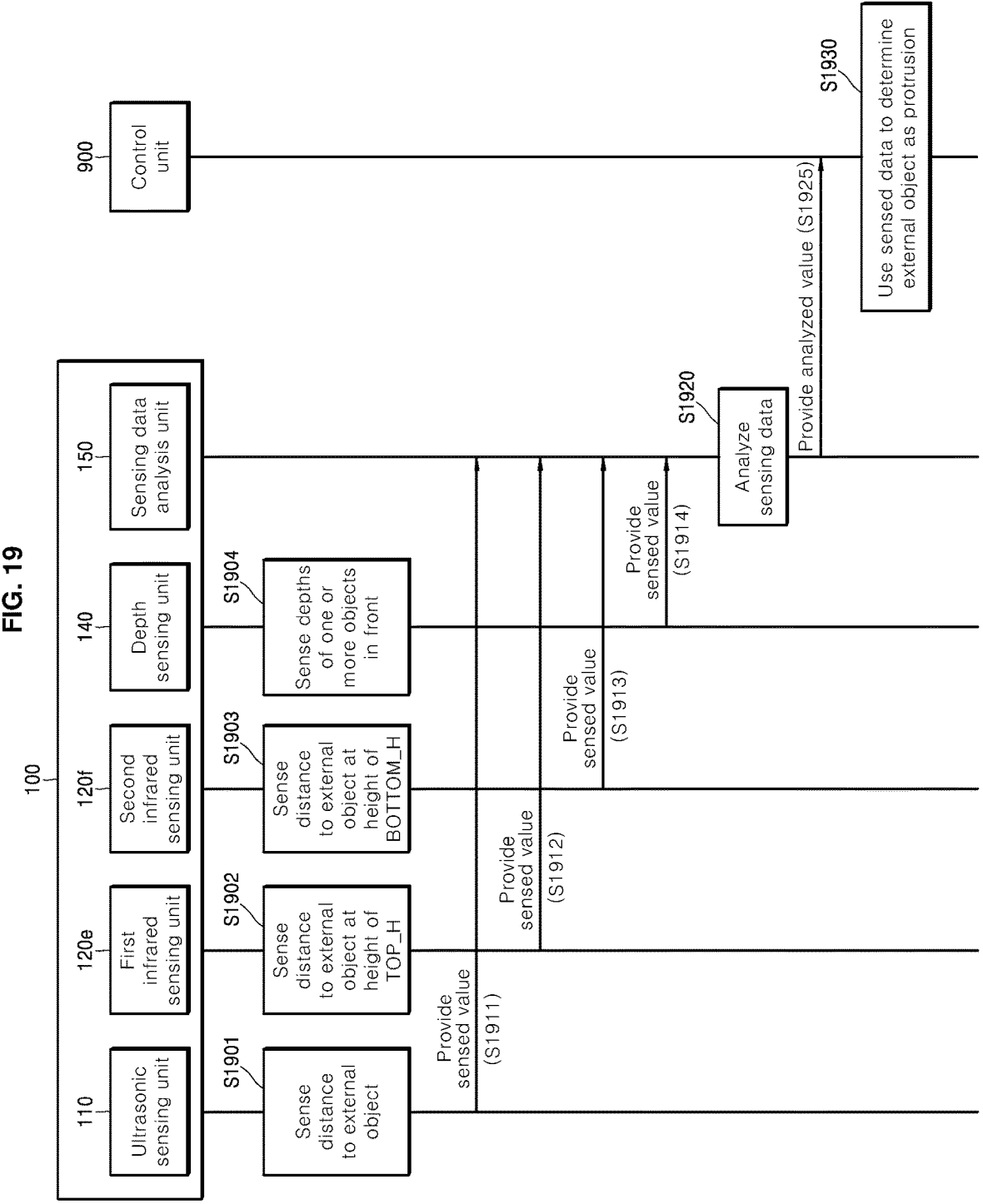
FIG. 19 is a diagram showing a process of mutual operation between components in a sensing module and a control unit according to an embodiment of the present disclosure.

FIG. 19 is a diagram showing a process of mutual operation between components in the sensing module and the control unit according to an embodiment of the present disclosure. Each of the sensing units constituting the sensing module 100 senses a distance to an external object. The ultrasonic sensing unit 110 senses a distance to an external object (S1901) and provides the sensed value to the sensing data analysis unit 150 (S1911).

The first infrared sensing unit 120e provided at the upper end of the robot senses a distance to an external object located at the TOP_H height (S1902) and provides the sensed value to the sensing data analysis unit 150 (S1912). The second infrared sensing unit 120f provided at the lower end of the robot senses a distance to an external object located at the BOTTOM_H height (S1903) and provides the sensed value to the sensing data analysis unit 150 (S1913). The depth sensing unit 140 provided in the front or upper portion of the robot senses the depth of one or more objects in front of the robot (S1904) and provides the sensed value to the sensing data analysis unit 150 (S1914). In one embodiment, the above-described steps S1911 to S1914 comprise transmitting data using the data bus or the like in the sensing module 100.

The sensing data analysis unit 150 corrects or analyzes the received sensed values or provides the most accurate analyzed value to the control unit 900 except the overlapping values (S1925). The control unit 900 uses the sensed data to determine whether or not the external object is a protrusion (S1930).

In one embodiment of a process of determining whether or not the external object is a protrusion, as shown in FIGS. 5 to 9, when the sensing data analysis unit 150 provides a distance u to an object sensed by the ultrasonic sensing unit and a distance r to an object sensed by the infrared sensing units to the control unit 900, the control unit 900 may use the values u and r, and optionally a value sensed by the depth sensing unit 140, the current robot position on the map, and the position of the sensed object on the map to determine whether or not the sensed object is a protrusion. In one embodiment, if the position of the sensed object coincides with that of a fixed object on the map or if a difference therebetween falls within a tolerance range (for example, within 5 cm), it is determined that the sensed object is not a protrusion.

The information on the protrusion acquired by the robot may be stored in the map storage unit 200 as shown in FIGS. 3 and 10, and the stored information may be exchanged with other robots via the communication unit 500.

FIG. 20 is a diagram showing a process of exchanging information on a protrusion between a plurality of robots or between a robot and a server according to an embodiment of the present disclosure.

A server 2000 downloads information on a protrusion to a plurality of robots 1000a, . . . , 1000z (S2001 and S2002). The information on the protrusion comprises the position and height at which the protrusion is located, the depth of the protrusion, and the like. The robots 1000a, . . . , 1000z update the received protrusion information into the map storage unit 200. The server 2000 may analyze the protrusion information transmitted by the plurality of robots 1000a, . . . , 1000z, update information sensed redundantly at the same position newly, and stores the updated information as single information on the protrusion. In addition, if the protrusion is removed, the latest received information may be corrected and downloaded.

Thereafter, the robots 1000a, . . . , 1000z sense another protrusion during running and update the information (S2010 and S2020). In one embodiment, updating the information comprises updating the information of the map storage unit held by each robot. In addition, newly acquired information on the protrusion may be shared by near-field communication between adjacent robots among the plurality of robots (S2015). At this time, the sharing of the information on the protrusion can be limited to only robots within a certain range. Alternatively, this information may be provided to a robot that is scheduled to move to the corresponding space.

Then, each of the robots 1000a, . . . , 1000z uploads the protrusion information acquired while running to the server 2000 (S2011 and S2021). The server 2000 updates the received protrusion information (S2030). In this process, the server 200 rearranges duplicated information into single information, or downloads new protrusion information by reflecting change situations such as sensing of a new protrusion, removal of the previous sensed protrusion and the like (S2031 and S2032).

In addition, in this process, not only the protrusion information but also the map information (FIG. 12) for a region where a specific function such as cleaning has been performed and a region where the specific function has not yet been performed can be transmitted together. For example, if there is a space that has not yet been cleaned due to any protrusion, information on this space can be provided to the robots 1000a, . . . , 1000z. When the protrusion is removed, any one of the robots 1000a, . . . , 1000z moving to the corresponding space can perform a certain function for the space that has not yet been cleaned.

In the present disclosure, it is possible to combine the various sensing performances and differences of detectable obstacles, thereby solving a problem that a specific function as cleaning or security checking has not been performed for many sections while a robot is travelling through a large space having various obstacles, such as an airport, a terminal, a hospital and so on, deteriorating efficiency of the specific function. That is, even when an obstacle higher than the robot height is detected by a sensor such as LiDAR, an ultrasonic sensor or an infrared sensor can be used to allow the robot to pass by the obstacle higher than the robot height.

In addition, in the case where the depths of the upper end/middle/lower end of the robot are different, for example, if the robot has a streamlined outer shape, the robot can determine whether an obstacle is located at which position of the upper end/middle/lower end to perform a function such as proximity cleaning or proximity security according to each position for as many regions as possible.

In the present disclosure, a three-dimensional map can be created for obstacles around the robot, particularly protrusions, by fusing the measurement range limits and the operation limits of various sensors such as an IR sensor, an ultrasonic sensor, a LiDAR sensor and a depth sensor including a depth camera and can be updated periodically. This 3D map can be provided to other robots so that they can reuse the updated 3D map in the next running.

It has been illustrated in the above embodiments that the robot is a robot having a cleaning function. However, the present disclosure is not limited thereto but is applicable to all autonomous robots. Particularly, the robot of the present disclosure is capable of applying a discrimination process to regions where the robot can travel and function by fusion of various sensors. By discriminating these regions, the robot can perform specific functions without entering these regions or can perform these functions in the most effective position.

In the present disclosure, in the case where the map stored in the map storage unit 200 is configured by a LiDAR sensor, when the robot 1000 moves based only on a fixed structure such as a wall and glass, the sensing module 100 of the present disclosure can identify protruding obstacles and sense the heights of the protrusions to determine whether or not the robot will advance. In addition, even when the robot does not advance, it is possible to identify a functional region where the robot can perform a function (cleaning, security, etc.). In particular, in the present disclosure, various structures may be arranged at a crowded place such as an airport, a terminal, a port, a train station, etc. In this process, when objects protruding from a wall or glass are located, the running of the robot cannot be controlled only with a map consisting of 2D information.

In the present disclosure, the robot can discriminate a region where the robot cannot enter due to a protrusion, so that the robot can perform a predetermined function (cleaning, security, etc.) in the corresponding region in a range as wide as possible, thereby increasing the efficiency of the function imposed on the robot. In addition, the information on protrusions and the information on regions where a function such as cleaning has been performed can be stored in a map in a 3D manner.

An aspect of the present disclosure provides a method of identifying a functional region in a 3-dimensional space, which is capable of calculating information such as height and depth of a protrusion located around a robot to check whether or not the robot can enter the functional region, so that the robot can perform a function in the functional region based on a result of the checking, and a robot implementing the method.

It is another aspect of the present disclosure to provide a method and apparatus for recognizing an external protruding object as well as a wall or glass and storing information about them in a map in a 3D manner. It is another aspect of the present disclosure to provide a method and apparatus for performing a function to be provided by a robot for a protruding space and storing information on the function performance or uploading this information to a server, etc. to check a region in the whole space in which the function has been performed.

Aspects of the present disclosure are not limited to the above-described aspects, and other aspects can be appreciated by those skilled in the art from the following descriptions. Further, it will be easily appreciated that the aspects of the present disclosure can be practiced by features recited in the appended claims and a combination thereof.

According to one aspect of the present disclosure, there is provided a robot that identify a functional region in a three-dimensional space, including a sensing module that senses a protrusion located outside a robot and provides height and depth information of the sensed protrusion; a functional unit that provides a predetermined function to the outside; a moving unit that moves the robot; a map storage unit that stores a map required for movement of the robot; and a control unit that controls these components.

According to another aspect of the present disclosure, there is provided a robot that identify a functional region in a three-dimensional space, which is capable of controlling a moving unit and a functional unit by comparing information provided by a sensing module and information stored in a map storage unit to identify a functional region in a three-dimensional space including a protrusion.

According to another aspect of the present disclosure, there is provided a method of identifying a functional region in a three-dimensional space by a robot, including: by a sensing unit of the robot, sensing the height and depth of a protrusion located outside the robot; providing the sensed height and depth information of the protrusion to a control unit of the robot; and, by the control unit, controlling the moving unit and the functional unit by comparing the height and depth information of the protrusion and information stored in a map storage unit of the robot to identify a functional region in a three-dimensional space including the protrusion.

According to an embodiment of the present disclosure, information such as the height and depth of a protrusion located around the robot in the process of moving the robot can be calculated to check whether or not the robot can enter a functional region. According to another embodiment of the present disclosure, it is possible to provide a method of performing a predetermined function by identifying a functional region in a space in which not only a wall or glass but also protruding objects are located, and a robot implementing the method.

According to another embodiment of the present disclosure, the robot can recognize an external protruding object as well as a wall or glass, store information about them in a map in a 3D manner, and share the stored information with other robots.

Although the features and elements are described in particular combinations in the exemplary embodiments of the present disclosure, each feature or element can be used alone or in various combinations with or without other features and elements. In addition, although each of the features and elements may be implemented as an independent hardware component, some or all of the features and elements may be selectively combined into one or more hardware components with a computer program having a program module that causes the hardware components to perform some or all of the functionality described herein. Codes and code segments of such a computer program will be easily conceivable by those skilled in the art. Such a computer program is stored on a computer-readable storage medium and may be read/executed by a computer to thereby implement the exemplary embodiments of the present disclosure. The storage medium of the computer program comprises a magnetic storage medium, an optical storage medium, a semiconductor storage device, etc. Further, the computer program implementing the exemplary embodiments of the present disclosure comprises a program module transmitted in real-time via an external device.

Although the exemplary embodiments of the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot that performs a predetermined function, the robot comprising:
    a sensor that detects a protrusion located outside the robot in a three-dimensional space and determines height and depth information about the protrusion;
    a driven wheel that moves the robot;
    a map memory that stores a map of a region around the robot; and
    a controller that compares the height and depth information about the protrusion that is collected by the sensor and the map stored in the map memory to identify a functional region in the three-dimensional space where the robot can perform the predetermined function,
    wherein the predetermined function is a cleaning function,
    wherein the robot further comprises:
        a cleaning head to perform the cleaning function; and
        an arm which can move at least one of horizontally or vertically to position the cleaning head relative to a body of robot, and
    wherein the robot performs the cleaning function in a portion of the functional region associated with the protrusion by extending the arm to position the cleaning head in the portion of the functional region when the protrusion prevents the body of the robot from entering the portion of the functional region.

2. The robot of claim 1, wherein the map stores information about a fixed object in a moving space of the robot in two dimensions and stores information about the protrusion in three dimensions, and a height at which the protrusion is located is smaller than a height of the robot.

3. The robot of claim 1, wherein the sensor includes:
    a first infrared sensor that is provided at an upper end of the robot and senses a distance to a first object located at a height of the robot;
    an ultrasonic sensor that is provided at a lower position than the first infrared sensor and senses a distance to a second object located outside the robot;
    a depth sensor that senses a depth of a third object in front of the robot; and
    a sensing data processor that analyzes data collected by the first infrared sensor, the ultrasonic sensor, and the depth sensor.

4. The robot of claim 3, wherein the sensing data processor provides the controller with the distance to the second object sensed by the ultrasonic sensor and the distance to the first object sensed by the first infrared sensor, and
    wherein the controller determines the protrusion based on a difference between the distance to the first object and the distance to the second object.

5. The robot of claim 3, wherein the sensor further includes a second infrared sensor that is provided at a lower end of the robot lower than the ultrasonic sensor and determines a distance to a fourth object located at a height over which the robot can pass.

6. The robot of claim 3, wherein the sensor further includes a light and distance ranging (LiDAR) sensor provided above the first infrared sensor.

7. The robot of claim 1, wherein the controller, when identifying the functional region, is further configured to include in the functional region, an area outside the robot that is blocked by the protrusion and within a movement range of the arm.

8. The robot of claim 1, wherein the controller, when identifying the functional region, is further configured to include in the functional region, a portion of the protrusion having an upper height that is below a reference height.

9. The robot of claim 1, further comprising a communication interface to forward the height and depth information about the protrusion to at least one of a server or another robot.

10. A method of controlling a robot that performs a predetermined function in a functional region of a three-dimensional space, the method comprising:
    detecting, by a sensor of the robot, a height and a depth of a protrusion located outside the robot in a three dimensional space;
    determining, by a controller of the robot, the functional region in the three-dimensional space including the protrusion based on the height and the depth of the protrusion and a map of a region around the robot; and
    controlling, by the controller, a movement of the robot to perform the predetermined function in the functional region,
    wherein the predetermined function is a cleaning function, and the robot includes a cleaning head, and an arm that moves the cleaning head at least one of vertically or horizontally to perform the cleaning function, and
    wherein the method further comprises performing the cleaning function in a portion of the functional region by extending the arm to position the cleaning head in the portion of the functional region when the protrusion prevents a body of the robot from entering the portion of the functional region.

11. The method of claim 10, further comprising
    storing information about a fixed object in a moving space of the robot in the map in two dimensions; and
    storing information about the protrusion in three dimensions.

12. The method of claim 10, wherein detecting the protrusion includes:
    sensing, by a first infrared sensor provided at an upper end of the robot, a distance to a first object located at a height of the robot;
    sensing, by an ultrasonic sensor provided at a lower position than the first infrared sensor, a distance to a second object located outside the robot;
    sensing, by a depth sensor, a depth of a third object in front of the robot; and
    analyzing, by a sensing data processor, data sensed by the first infrared sensor, the ultrasonic sensor and the depth sensor to determine the height and the depth of the protrusion.

13. The method of claim 12, further comprising
    providing, by the sensing data processor, the controller with the distance to the second object sensed by the ultrasonic sensor and the distance to the first object sensed by the first infrared sensor; and
    determining, by the controller, the protrusion associated with the first and second objects based on a difference between the distance to the first object and the distance to the second object.

14. The method of claim 12, further comprising:
    sensing, by a second infrared sensor provided at a lower end of the robot lower than the ultrasonic sensor, a distance to a fourth object located at a height over which the robot can pass.

15. The method of claim 12, further comprising
    sensing, by a light and distance ranging (LiDAR) sensor provided above the first infrared sensor, an attribute of the protrusion.

16. The method of claim 10, wherein determining the functional area includes:
    including, in the functional region, an area outside the robot that is blocked by the protrusion and within a movement range of the arm.

17. The method of claim 10, wherein determining the functional area includes:
    including, in the functional region, a portion of the protrusion having an upper height that is below a reference height.

18. The method of claim 10, further comprising:
    forwarding the height and depth information about the protrusion to at least one of a server or another robot.

19. A robot that performs a function, the robot comprising:
    a body;
    a sensor that detects an obstacle located outside the body of the robot in a three-dimensional space and determines height and depth information about the obstacle;
    a wheel that rotates to move the body of the robot;
    a functional unit to perform the function; and
    an arm which can move at least one of horizontally or vertically to position the function unit relative to the body of robot,
    a controller that compares the height and depth information about the obstacle and a stored map of a region around the robot to identify a functional region in the three-dimensional space where the robot can perform the function;
    wherein the arm extends to move the functional unit in a portion of the functional region when the obstacle prevents the body of the robot from entering the portion of the functional region.

20. The robot of claim 19, wherein the controller, when identifying the functional region, is further configured to include in the functional region, an area outside the robot that is blocked by the obstacle and within a movement range of the arm.

* * * * *